Sept. 26, 1961 R. L. SMIRL 3,001,415
TRANSMISSION
Filed May 11, 1954 5 Sheets-Sheet 5
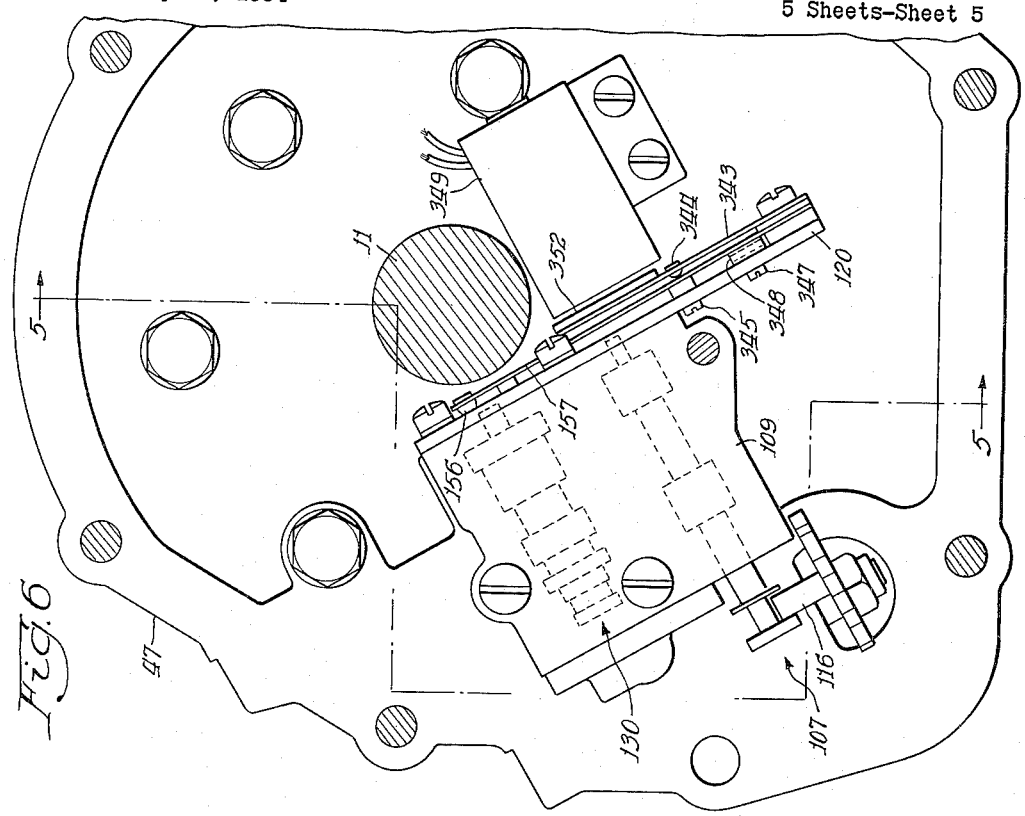
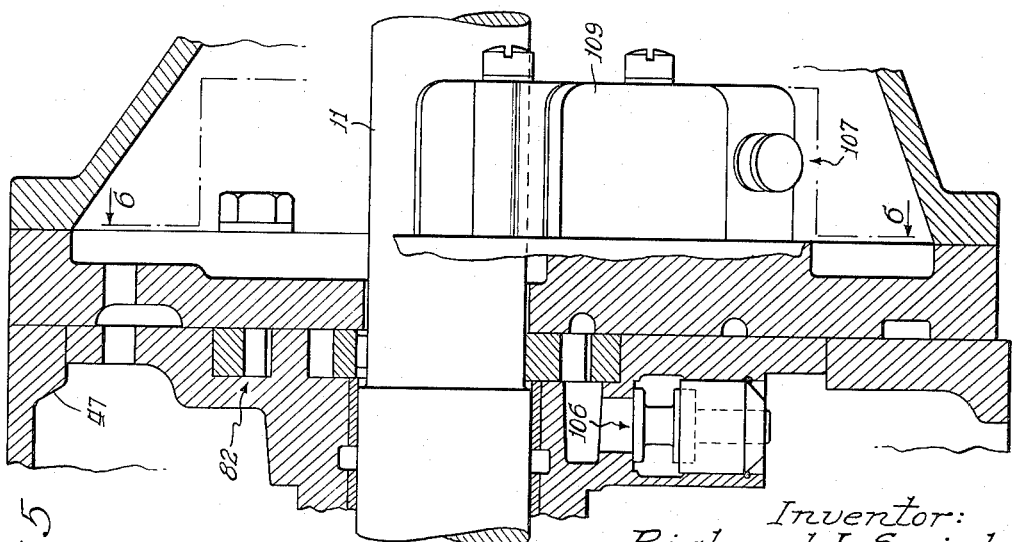
Inventor:
Richard L. Smirl
By: Keith J. Blewer
Atty.

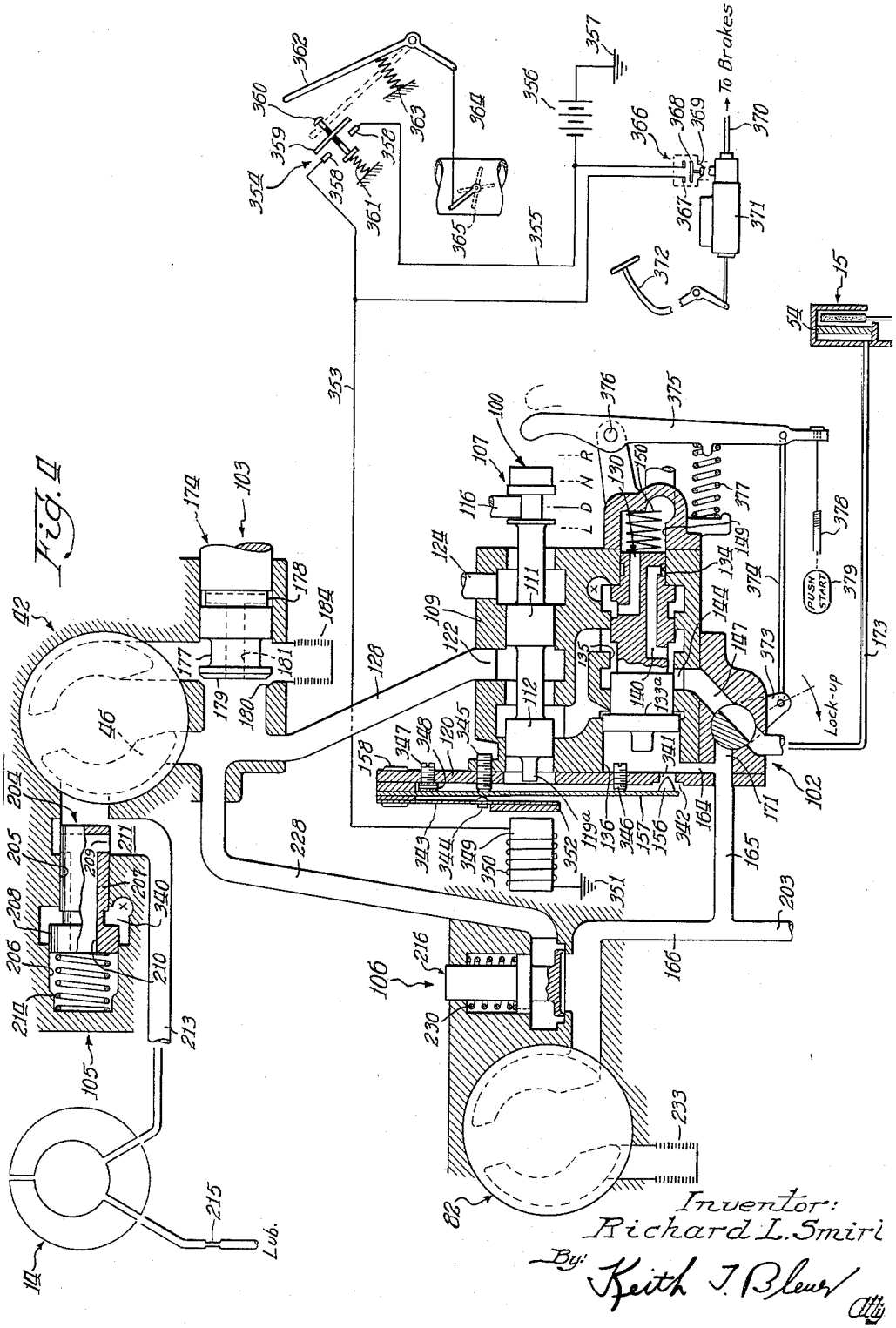

United States Patent Office 3,001,415
Patented Sept. 26, 1961

3,001,415
TRANSMISSION
Richard L. Smirl, La Grange, Ill., assignor to Borg-Warner Corporation, Chicago, Ill., a corporation of Illinois
Filed May 11, 1954, Ser. No. 428,917
17 Claims. (Cl. 74—472)

My invention relates to transmissions for automotive vehicles and more particularly to such transmissions of the hydraulic type.

It is an object of the present invention to provide an improved hydraulic transmission which comprises a hydraulic torque converter driven from the drive shaft of the transmission and which is so arranged that a power train, preferably a direct drive, may be completed between the drive and driven shafts of the transmission exclusive of a power train including the hydraulic torque converter, so that the two power trains may be simultaneously completed to provide an improved engine braking effect on the driven shaft of the transmission and on the vehicle. In this connection it is an object to provide a maually controlled selector valve which in one position completes a reverse drive power train between the hydraulic torque converter and the driven shaft and in another position completes a low speed forward drive power train between the torque converter and the driven shaft and a valve for controlling a direct drive clutch for directly connecting the drive and driven shafts which may be simultaneously actuated with the selector valve to simultaneously complete the direct drive power train and either the reverse drive power train or the low speed forward drive power train. It is contemplated, more particularly, that the transmission shall preferably constitute a hydraulic torque converter connected in tandem with a speed reducing planetary gear set for the low speed drive and that the reverse drive shall be accomplished by braking the rotor or driven element of the hydraulic torque converter, so that the stator or reaction element of the hydraulic torque converter drives through the planetary gear set for the reverse drive, and that a direct drive friction clutch be provided coupling directly the drive and driven shafts of the transmission which may be engaged when either the low speed forward drive or the reverse drive are completed through the transmission for providing improved vehicle braking effects.

It is also an object, in connection with the manually controlled low-reverse selector valve and the direct drive clutch valve to provide a connection between the valves so that when the selector valve is moved into its reverse drive position, such movement automatically positions the direct drive clutch valve for applying the clutch. In this connection, it is contemplated that a pump driven by the driven shaft of the transmission may be connected with the direct drive clutch when the direct drive clutch valve is so actuated; and the pump since it supplies no pressure for reverse rotation of the driven shaft, is effective only for engaging the direct drive clutch in the event of movement of the vehicle in the forward direction for giving improved vehicle braking effect.

It is also an object to provide in conjunction with a vacuum motor connected with and under the influence of the vacuum in the fuel inlet manifold of the internal combustion vehicle engine for increasing fluid pressure on fluid pressure engaged power train completing brakes and clutches of the transmission with increased throttle opening of the vehicle motor, a piston also effective on the vacuum motor and under the control of a pressure that increases with the speed of the driven shaft for reducing the engaging pressure on the friction brakes and clutches with increases in vehicle speed, inasmuch as the high engaging pressures are not needed as the driven shaft speed increases and as the torque conversion through the torque converter thereby decreases.

It is also an object of the invention to provide an improved arrangement for supplying a fluid pressure that increases with the speed of the driven shaft of the vehicle and which is not only impressed on the vacuum motor as above mentioned but also on an automatic shift valve for shifting the transmission from a low speed forward drive to a high speed forward drive. This arrangement may preferably comprise a turbulent sharp edged orifice connected with the outlet of a driven shaft pump and a valve element partially closing the turbulent orifice and carried by a spring strip of homogeneous spring metal anchored at one end. It is contemplated that this strip of spring metal carrying the valve element will function to cause the pressure from the driven shaft pump regulated by the turbulent orifice to increase substantially the same with increases in pump speed regardless of changes in temperature and resulting viscosity of the oil discharged by the pump.

It is also an object to apply the fluid pressure, which is caused by the vacuum motor to decrease with vehicle speed, on one face of an automatic shift valve changing the transmission from a low speed to a high speed forward drive when shifted, with the driven shaft pump pressure that increases with the driven shaft speed being impressed on an opposite face so that the two pressures increasing and decreasing with vehicle speed cross and provide shifting of the automatic shift valve at accurately predetermined vehicle speeds.

In connection with the homogeneous resilient metal strip carrying the valve element for the turbulent orifice, it is an object to provide an auxiliary spring effective on the resilient strip which is controlled either by the manual selector valve or a part movable therewith or by an accelerator controlled part for releasing the resilient strip and causing the pressure as regulated by the turbulent orifice to decrease and allow a downshifting movement of the automatic shift valve piston, the auxiliary spring preventing an overtravelling movement of the valve element for the turbulent orifice due to inertia of any linkages moving the auxiliary spring.

It is also an object to provide improved mechanism in connection with the spring valve carrying strip under the control of the vehicle accelerator for relieving force of the spring strip when the accelerator is moved to an open throttle position for causing a decrease in the driven shaft responsive pressure and thereby a downshifting movement of the automatic shift valve and a reduction in the transmission speed ratio. More particularly, it is contemplated that this mechanism may be electrical in nature and effective on the said auxiliary spring for releasing pressure on the spring strip. It is also an object to provide mechanism for relieving pressure exerted by the spring valve carrying strip controlled by the vehicle brakes for causing a downshift in transmission ratio when the vehicle brakes are applied.

It is another object of the invention to provide an improved automatic shift valve which is arranged with lands of progressively increasing diameter from one end of the valve to the other which permits boring the valve body completely from one side instead of both sides.

The invention consists of the novel constructions, arrangements and devices to be hereinafter described and claimed for carrying out the above stated objects and such other objects as will appear from the following description of preferred embodiments of the invention, illustrated with reference to the accompanying drawings, wherein:

FIG. 4 is a diagram showing still another modified form of the transmission controls;

FIG. 5 is a partial, longitudinal, sectional view through the transmission showing the application of certain valving of the FIG. 4 embodiment of the controls to the transmission and constituting a sectional view taken on line 5—5 of FIG. 6; and FIG. 6 is a sectional view taken on line 6—6 of FIG. 5.

Like characters of reference designate like parts in the several views.

Figure 1:
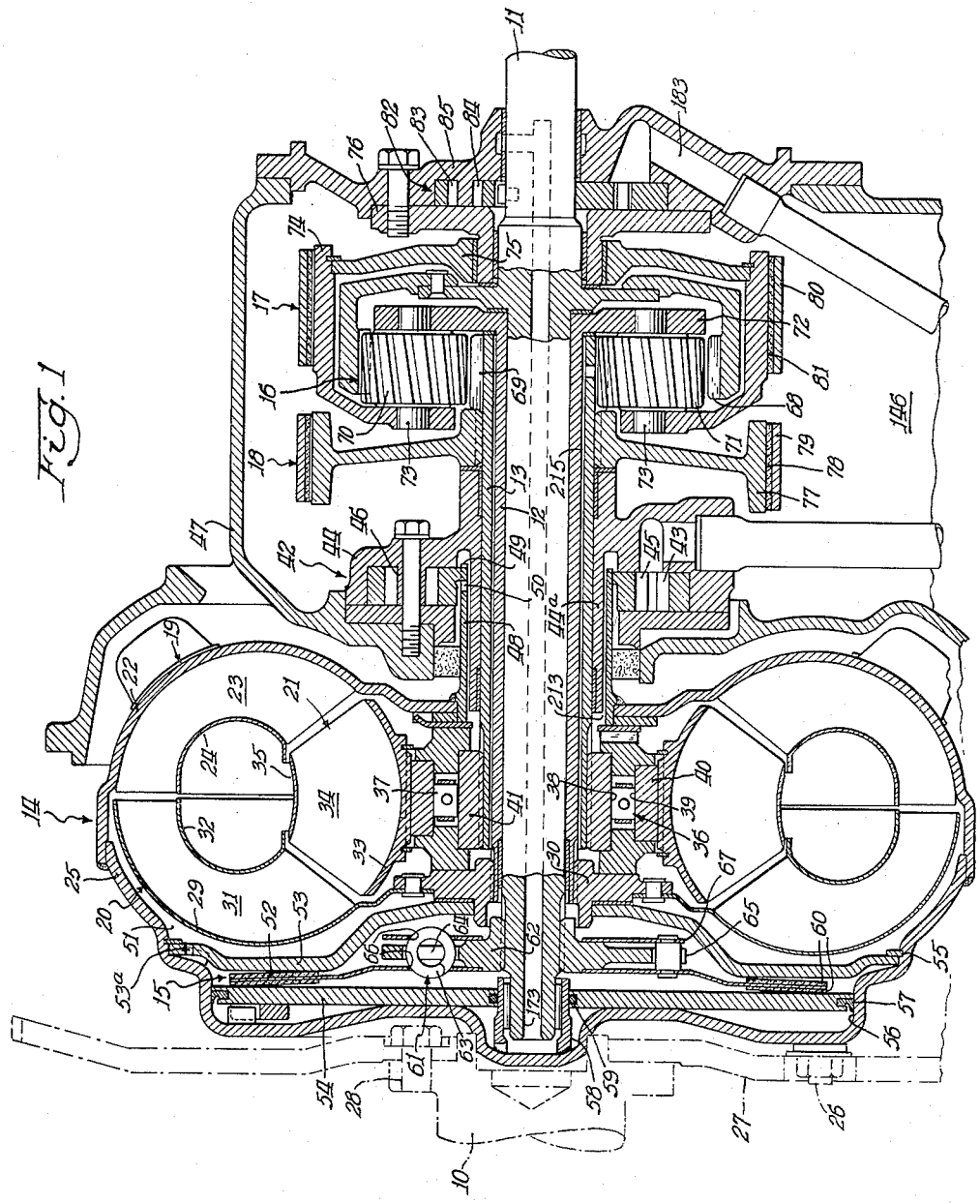
FIG. 1 is a longitudinal sectional view of a transmission embodying the principles of the invention.

Referring now to FIG. 1, the illustrated transmission comprises a drive shaft 10, a driven shaft 11, an intermediate quill shaft 12, and a quill shaft 13 surrounding the shaft 12. The transmission comprises, in general, a hydraulic torque converter 14, a direct drive friction clutch 15, a planetary gear set 16, a reverse drive friction brake 17 and a low speed forward drive friction brake 18.

The hydraulic torque converter 14 is of the ordinary three element type and comprises an impeller 19, a runner 20 and a stator 21. The impeller 19 comprises an outer semi-toroidal shell 22 having blades 23 fixed therein by any suitable means and having an inner semi-toroidal shell 24 in contact with the inner edges of the vanes 23. The shell 22 is fixed at its open face to a shell 25 which in turn is fixed by means of studs 26 to a fly wheel 27. The fly wheel 27 is fixed by screws 28 to the drive shaft 10.

The runner 20 comprises an outer semi-toroidal shell 29 fixed to a hub 30 which is splined to the shaft 12. Runner blades 31 are fixed within the shell 29, and an inner semi-toroidal shell 32 is fixed to the blades 31 on their inner edges. The stator 21 comprises a semi-toroidal shell 33 having stator blades 34 fixed thereto and an inner semi-toroidal shell 35 fixed to the inner edges of the vanes 34.

A one-way brake 36 which may be of any suitable construction is provided between the stator 21 and the shaft 13. The brake 36 in its illustrated form comprises a plurality of tiltable grippers 37 disposed between inner and outer cylindrical race surfaces 38 and 39. The surface 39 is formed on an annular member 40 which is splined within the stator casing 33, and the surface 38 is formed on a sleeve-like member 41 which is splined to the shaft 13.

A pump 42 is provided to be driven through the torque converter casing members 22 and 25 from the drive shaft 10. The pump comprises an outer gear 43 rotatably disposed within a casing 44 and an inner gear 45 in mesh with the outer gear at one point and separated from the outer gear opposite thereto by a crescent shaped casing portion 46. The casing 44 for the pump is fixed with respect to the casing 47 for the transmission, as shown.

A short sleeve shaft 48 is fixed to the torque converter casing member 22 and is fixed with respect to the inner gear 45 of the pump 42 by means of teeth 49 provided on the end of the shaft 48 intermeshing with the teeth 50 provided on the inner surface of the inner gear 45. The shaft 48 surrounds a sleeve extension 44a of the pump casing 44 as shown.

The torque converter casing members 22 and 25 provide a fluid container or housing 51. The torque converter is of the usual construction in which, when the impeller 19 is driven from an engine, the runner 20 is driven at increased torque in the forward direction, that is, in the same direction of rotation as the impeller 19 rotates. The stator 21 under these conditions is held stationary by the one-way brake 36 and takes the reaction in the reverse direction to provide this increased torque on the runner 20, the stator 21 having curved blades 34 which receive the fluid from the runner 20 and change its direction so that the fluid is returned to the impeller 19 in the direction in which the impeller rotates. As the speed of the runner 20 increases, the torque ratio between the impeller 19 and runner 20 decreases, and when substantially a one to one torque ratio is reached, the reaction on the stator 21 reverses, and the stator then tends to rotate in a forward direction which rotation is permitted by the one-way brake 36 that releases for this direction of rotation. The torque converter 14 also functions, in accordance with well-known operating principles of such converters, to drive the stator 21 in the reverse direction due to the reaction on the stator in this direction when the impeller 19 is driven in the forward direction, if the runner 20 is restrained from rotation in the forward direction.

The clutch 15 is provided in the fluid container 51 and comprises a friction disk 52 adapted to be engaged between an axially stationary pressure plate 53 and an axially movable piston 54. The pressure plate 53 is axially fixed within the impeller casing member 25 by means of a ring 55 fitting against the outer periphery of the pressure plate 53 and disposed in a groove provided in the inner surface of the casing member 25. The casing member 25 is provided with a cylindrical inner surface 56, and the piston 54 is slidably disposed within this cylindrical surface. A seal 57 is carried by the piston 54 at its outer periphery and slides on the surface 56. A sleeve 58 is fixed to the casing member 25 at its center, and the piston 54 has a central opening receiving the sleeve 58, a seal 59 being disposed in a groove provided in the inner edge of the piston 54 and sealing the piston with respect to the sleeve 58. The pressure plate 53 is provided with a plurality of holes 53a therethrough adjacent its outer periphery which provide communication between the two sides of the plate 53, whereby the same fluid pressure to which the bladed torque converter elements 19, 20 and 21 are subjected is also impressed on the side of the piston 54 contacting the clutch disk 52. The holes prevent any trapping of fluid between the piston 54 and the plate 53 which would prevent axial movement of the piston in the cylindrical surface 56.

The clutch disk 52 is provided with annular friction elements 60 on each side thereof engageable between the piston 54 and the pressure plate 53, and the clutch disk 52 is connected by means of a spring dampener 61 with a hub 62 splined to the shaft 11. The spring dampener 61 comprises a plurality of compression springs 63 disposed in slots 64 provided in an outwardly extending relatively thin portion 65 of the hub 62 and disposed also in slots 66 provided in the clutch disk 52 and in a washer 67, the disk 52 being disposed on one side of the hub portion 65 and the washer 67 being disposed on the other side of the portion 65. The construction of the spring dampener 61 is well-known, and hence further detailed showings are not believed necessary.

A gear set 16 comprises a ring gear 68 which is connected to the driven shaft 11, a sun gear 69 formed on the shaft 13, planet gear 70 in mesh with the ring gear 68, planet gears 71 in mesh with the sun gear 69 and each in mesh with a planet gear 70, and a planet gear carrier 72 for the gears 70 and 71. The planet gear carrier 72 comprises stub shafts 73 on which the planet gears 70 and 71 are rotatably disposed, an outer hollow portion 74 and a hub portion 75 rotatably disposed on a casing portion 76 fixed with respect to the casing 47.

The brake 18 comprises a drum 77 splined to the shaft 13 and provided with an outer cylindrical surface 78 adapted to be engaged by a brake band 79. The brake 17 comprises a brake band 80 adapted to engage a cylindrical outer surface 81 formed on the carrier portion 74.

A pump 82 is provided which is adapted to be driven by the driven shaft 11 of the transmission. The pump 82 is similar in construction to the pump 42 and comprises an outer gear 83 eccentrically disposed with respect to an inner gear 84 and in mesh with the inner gear. A crescent shaped casing portion is disposed between the gears 83 and 84 opposite their point of mesh, the crescent shaped casing portion being carried by a pump casing portion 85 fashioned to receive the gears 83 and 84. The casing portion 76 closes the pump and particularly the recess provided in the casing portion 85 for the gears 83 and 84.

The illustrated transmission provides low and high forward speed drives and a drive in reverse as well as a number of power trains for braking the vehicle from the vehicle engine. The low speed forward drive is completed by engaging the brake 18 by applying the band 79 on the drum surface 78. The brake 18 functions to hold the sun gear 69 against rotation and, through the shaft 13 and the one-way device 36, functions to hold the stator 21 against reverse rotation. The drive in low speed forward is from the drive shaft 10 through the fly wheel 27, the torque converter 14, from the impeller 19 to the runner 20, the shaft 12, the carrier 72 for the planet gears 70 and 71 and the ring gear 68 to the driven shaft 11. Since the planetary gear set 17 is of the dual pinion type, having two planet gears 70 and 71 in series between the sun gear 69 and the ring gear 68, the ring gear 68 and the driven shaft 11 will be driven at increased torque and reduced speed from the shaft 12, which functions as a drive shaft with respect to the gear set 16. The torque converter 14 functions to provide a drive at increased torque to its output shaft 12 with the stator 21 being held stationary by the one-way brake 36 and the friction brake 18, so that the shaft 11 is driven at an increased torque which is the product of the torque multiplications produced by the torque converter 14 and the gear set 16.

High speed forward drive, which is a direct drive, is provided by engaging the clutch 15 and disengaging the brake 18, and the drive in this case is from the drive shaft 10 through the flywheel 27, the casing member 25, the clutch 15, including the spring dampener 61, to the driven shaft 11.

Reverse drive is completed by engaging the brake 17 by applying the brake band 80 on the cylindrical drum surface 81, maintaining the clutch 15 and the brake 18 disengaged. The brake 17 functions to hold the runner 20 stationary since the carrier 72, on which the brake surface 81 is provided, is connected with the runner 20 through the shaft 12 and the hub 30. With the runner 20 stationary and with the impeller 19 being driven in the forward direction from the shaft 10 and the fly wheel 27, the reaction on the stator 21 is in the reverse direction, and the stator rotates in this direction. Such rotation is transmitted through the one-way engaging device 36, which now functions as a one-way clutch, the shaft 13 on which the hub 41 of the one-way device 36 is splined, the sun gear 69, the planet gears 71 and 70 and the ring gear 68 to the driven shaft 11. The carrier 72 for the planet gears 71 and 70 is held stationary as just described, and the brake thus has the two-fold function of holding the carrier 72 against rotation and holding the runner 31 against rotation and taking the reaction from both the carrier 72 and the runner 31. Since the planet gear set 16 is of the dual pinion type, the ring gear 68 and thereby the shaft 11 are driven at an increased torque and reduced speed with respect to the shaft 13 which functions under these conditions as the drive shaft for the gear set 16, the shaft 13 being driven in the reverse direction by the stator 21 as has just been described.

The vehicle engine may be started by pushing or towing the vehicle, thus rotating the driven shaft 11, and by engaging the friction clutch 15 by fluid pressure derived from the pump 82 which is driven by the driven shaft 11, as will be hereinafter described in greater detail.

Braking the vehicle by means of the vehicle engine is, of course, possible in either low speed forward drive or high speed forward drive, with the brake 18 or the clutch 15 respectively engaged, since both of these drives are two-way drives. An augmented engine braking effect for the vehicle may be obtained by engaging both the brake 18 and the clutch 15 simultaneously. The clutch 15 as has been described, completes a direct drive between the shafts 10 and 11, and the application of the brake 18 simultaneously causes the runner 20 to be rotated at an increased speed with respect to the impeller 19. The brake 18 holds the sun gear 69 stationary, and the ring gear 68, being connected to the driven shaft 11, rotates along with and at the same speed as the driven shaft 11, causing the carrier 72 to be driven at an overdrive or overspeed with respect to the shaft 11, since the planetary gear set 16 is of the dual planet gear type. The runner 20 is connected with the carrier 72 by means of the shaft 12, as has been previously described, and the runner is thus driven at an overspeed with respect to the shafts 10 and 11 against the resistance produced by the fluid in the torque converter 14 by such a difference in speed between the impeller 19 and runner 20. This resistance to the overspeed rotation of the runner 20 is transmitted by the gear set 16 to the driven shaft 11 so as to provide an increased braking effect on the driven shaft 11 and thereby on the vehicle.

A still further augmented engine braking effect for movement forwardly is produced by a simultaneous engagement of the clutch 15 and the brake 17. The clutch 15, as previously described, when engaged, couples directly the drive shaft 10 and the driven shaft 11. A simultaneous engagement of the brake 17 holds the turbine 20 stationary since the carrier 72, on which the brake 17 is effective, is connected by means of the shaft 12 with the turbine 20. The turbine 20, when stationary functions to retard the rotation of the impeller 23 through the fluid of the torque converter 14 and thus of the drive shaft 10 connected thereto and thus prevents the increase in engine speed which would otherwise be obtained when the driven shaft 11 tends to increase in speed. The driven shaft 11 is also correspondingly held from increased speed since the shaft 11 is connected to the shaft 10 at this time by the clutch 15.

An augmented engine braking effect for movement forwardly is obtained by engagement of the reverse drive brake 17, with the clutch 15 remaining disengaged. The effect of the turbine 20 to retard the rotation of the impeller 23 and thus of the drive shaft 10 is the same as just described, although in some cases, the braking effect may be such as to cause the vehicle engine to stall without the clutch 15 being engaged to directly connect the driven shaft 11 with the drive shaft 10. When the reverse brake 17 is engaged for braking effect, I have found that if this engagement occurs above a certain predetermined low forward speed of the vehicle, such as at fifteen m.p.h., the torque converter 14 exerts a relatively mild vehicle braking effect, with the fluid flowing in the converter 14 in one direction, while if the brake 17 is engaged with the vehicle moving forwardly at some lower speed, such as at ten m.p.h., the torque converter 14 causes a relatively drastic braking effect, and the fluid in the torque converter flows in the opposite direction.

Referring to the above-mentioned vehicle braking effects, with the reverse drive brake 17 being engaged and with the direct drive clutch 15 being either engaged or disengaged, engagement of the brake 17 completes an overdrive power train from the driven shaft 11 to the stator 21 through the gear set 16. The ring gear 68 connected to the driven shaft 11 is larger in size than the sun gear 69, and, since the gear set 16 includes the two planet gears 70 and 71 in series between the ring gear 68 and the sun gear 69, the sun gear 69 is driven from the ring gear 68 at a greater speed and in the same direction. The stator 21 is driven from the sun gear 69 in the forward direction through the shaft 12 and one-way device 36 for forward coasting movement of the vehicle.

The torque converter 14 is of the ordinary three element type in which, as shown, the blades 34 of the stator are sectors the inlet and outlet ends of which are located at the same distance in the radial direction from the center longitudinal axis of the torque converter, while the blades 23 of the impeller 22 extend from the outlet ends of the stator blades 34 to the outermost part of the torque converter, and the runner blades 31 extend from the outlet ends of the impeller blades 23 inwardly to the inlet ends of the stator blades 34. The details of such a torque converter of this well-known type is shown in the patent to V. J. Jandasek No. 2,663,148, issued December 22, 1953, which may be referred to. In such a hydraulic torque converter, the impeller blades 23 are relatively flat, that is, they have little curvature on their mean fluid flow lines, the turbine blades 31 have a substantial curvature along their mean flow lines directing the fluid into the inlet ends of the stator blades 34 in the opposite direction to which the impeller 19 is driven, and the stator blades 34 have their entrance ends extending approximately parallel with the longitudinal axis of the torque converter and are curved so that their trailing edges extend in the direction of rotation of the impeller 19.

The impeller 19 since it is driven by the vehicle engine tends to cause movement of the fluid from the entrance ends of its blades 23 radially outwardly, due to the centrifugal effect, to the exit ends, its blades and thence toroidally through the runner blades 31 and thence through the stator blades 34 to the entrance ends of the impeller blades 23. When the stator is driven by means of the gear set 16 due to forward movement of the vehicle and forward rotation of the driven shaft 11, the stator also will tend to move the fluid toroidally through the vanes of the impeller, runner and stator; however, since the trailing edges of the stator blades are substantially ahead of the entrance ends of the stator blades in the direction of rotation of the impeller, this tendency is to move the fluid toroidally in the opposite direction from that induced by the impeller 19. The actual direction of toroidal fluid flow in the torque converter 14 is thus determined by the relative speeds of the impeller 19 and the stator 21—if the stator has a relatively high speed with respect to the impeller 19, it causes the fluid to flow toroidally within the torque converter 14 in the direction opposite to that in which the fluid normally flows, the effect of the stator 21 bucking and overcoming the effect of the impeller 19. When the speed of the stator 21 and the speed of the driven shaft 11 in the forward direction are relatively low, the stator does not have sufficient effect to reverse the flow of fluid within the torque converter 14 from its normal direction of flow.

At low speeds of the vehicle, and therefore at low speeds of the stator 21 compared to the impeller 19, the flow of fluid within the converter, as has just been described, is in the conventional direction, namely, from impeller to runner to stator to impeller. In this case, the fluid flow from the runner 20 into the stator 21 tends to rotate the stator in the reverse direction through the carrier 72, the shaft 12 and the one-way unit 36, particularly since the runner 20 is held stationary by the brake 17. The forward rotation of the stator 21 is thus against a considerable force, and this force is transmitted through the gear set 16 to the driven shaft 11 and is multiplied by the gear set so as to effect the drastic braking effect above referred to. When, however, the shaft 11 and thereby the stator 21 are rotating at relatively high speeds, the flow of fluid within the converter 14 is reversed as has been described, the fluid flowing from the stator 21 to the turbine 20 and thence to the impeller 19 and finally back into the stator again. Since the impeller blades are nearly radial and have little curvature to them, the fluid flowing from the impeller blades into the stator strikes the rear surfaces of the stator blades and tends to move the stator in the forward direction. The bucking effect just described in connection with the normal flow of fluid in which the drastic braking effect is obtained is thus not present under these conditions when the flow of fluid in the converter is reversed from normal. Under these conditions, the stator causes the abnormal direction of fluid flow in the converter 14, and it is this work that is done by the stator and the force causing the work that is reflected through the gear set 16 to the driven shaft 11 as drag on the shaft 11 providing the mild braking effect above referred to.

The drastic braking effect above mentioned varies with the ratio of speed between the stator 21 and the impeller 19, the drastic braking effect becoming greater as the speed of the stator increases with respect to the speed of the impeller up to a predetermined ratio (above this ratio the mild braking effect occurs with the direction of toroidal flow of fluid in the converter reversing). When the direct drive clutch 15 is engaged also, along with the brake 17, it assures that the shafts 10 and 11 rotate at the same speed, and the stator 21 is rotated at its low speed with respect to the impeller 19 so that the above-mentioned drastic braking effect is obtained, this drastic braking effect being constant and unvarying, since the clutch 15 keeps the speed ratio between the stator and impeller constant. Without the clutch 15 being engaged, this speed ratio between stator and impeller can vary since the engine speed can be varied, and, of course, the vehicle speed can be varied. The sizes of the gears in the set 16 can be changed and the angles of the blades in the converter 14 can also be changed in order to vary the drastic braking effect with any certain speed ratio between the stator and impeller, and, in fact, the drastic braking effect can by such changes be changed to the mild braking effect when the clutch 15 is engaged; however, it is contemplated that the set 16 and the converter 14 are preferably designed so that the drastic braking effect occurs at the speed ratio of the impeller 19 and stator 21 produced when the clutch 15 is engaged.

Figure 2:
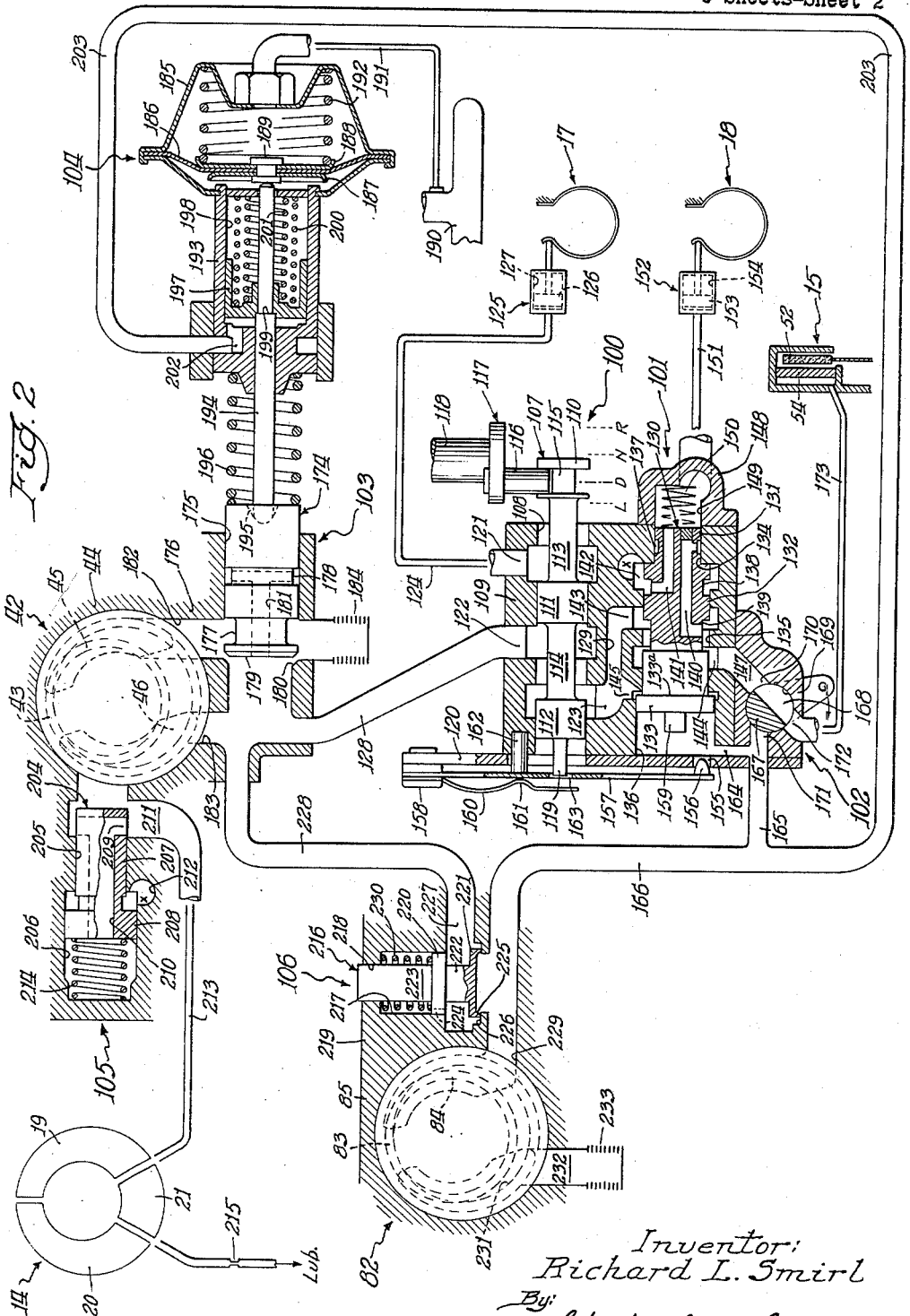
FIG. 2 is a diagram showing hydraulic controls for the transmission and embodying the principles of the invention.

Referring now to FIG. 2, the control system for the transmission which is illustrated in this figure comprises in general the engine driven pump 42, the vehicle driven pump 82, a manual selector valve 100, an automatic shift valve 101, a lock-up valve 102, a pressure control valve 103, a vacuum responsive motor 104 for controlling the valve 103, a pressure reducer valve 105, and a check valve 106.

The manual selector valve 100 comprises a valve piston 107 slidably disposed in a cylindrical cavity 108 formed in a valve casing 109. The piston 107 is provided with lands 110, 111 and 112 spaced by grooves 113 and 114. The piston is also provided with a groove 115 in the land 110 adapted to receive a pin 116 of an oscillatable shift member 117. The shift member 117 comprises the shaft 118 by means of which the member 117 may be oscillatably mounted in any stationary casing (not shown). The piston 100 is provided on its other end with a reduced axially extending portion 119.

The valve casing 109 is provided with an end plate 120. The cavity 108 is provided with ports 121, 122 and 123, and the cavity 108 is open on both its ends. The port 121 is connected by means of a conduit 124 with a servo motor 125 for engaging the brake 17. The motor 125 comprises a piston 126 slidably disposed in a cylinder 127 connected with the conduit 124. The port 122 is connected with a pressure supply conduit 128, and the port 123 is connected with a conduit 129 in the valve body 109.

The automatic shift valve 101 comprises a piston 130 having a relatively small diameter land 131, an intermediate size land 132 and a relatively large diameter land 133. The lands 131, 132 and 133 are respectively slidable in correspondingly sized connected cavities 134, 135 and 136 provided in the valve body 109. The piston 130 is provided with grooves 137, 138 and 139. The grooves 137 and 139 are connected by means of a passage 140 provided in the valve piston 130, and the groove 138 is connected with the right end of the piston 130 by means of a passage 141.

The connected cavities 134, 135 and 136 are provided with ports 142, 143, 144 and 145. The port 142 is a bleed port adapted to freely discharge into the oil sump 146 located in the bottom of the transmission casing 47.

The port 143 is connected with the passage 129; the port 144 is connected with a discharge passage 147; and the port 145 is connected to the passage 129.

The valve body 109 has fixed thereto a shell 148 provided with a cylindrical cavity 149 which is aligned with the cavity 134. A compression spring 150 is disposed in the shell 148 between the closed end of the cavity 149 and the piston 130. The cavity 149 is connected by means of a conduit 151 with a servo motor 152 for engaging the brake 18. The servo motor 152 is similar to the motor 125 and comprises a piston 153 disposed to operate on one end of the brake band 79 and slidably disposed in a cylinder 154.

The plate 120 at the end of the cavity 136 is provided with an orifice 155 therethrough in communication with the cavity 136, and as will be noted, the orifice is sharp edged on both ends. A conical valve element 156 is disposed in the orifice 155 for more or less closing the orifice and restricting the flow of fluid therethrough, and this valve element is carried by a resilient sheet metal strip 157 anchored with respect to the plate 120 by means of a stud 158 extending through the strip and plate. The orifice 155, like the port 142, is adapted to discharge fluid into the sump 146. A tip 159 of reduced thickness is provided on the left end of the piston 130 for abutting the plate 120 and limiting the movement of the piston 130 to the left.

A spring 160 of resilient strip metal is fixed by the stud 158 above the strip 157 and is provided with a protruding part 161 adapted to bear on the strip 157 and hold the strip 157 against a pin 162 fixed in the valve body 109. The resilient strip 157 is provided with an opening 163 therethrough, and the tip 119 of the valve piston 107 is adapted to move through the opening 163 and act on the spring 160 so as to relieve the resilient strip 157 from the action of the spring 160. The cavity 136 is connected by means of a restricted passage 164 and a branch conduit 165 with a pressure supply conduit 166.

The lock-up valve 102 comprises a rotatable piston 167 having a passage 168 therethrough rotatably disposed in a cylindrical cavity 169 provided in the valve body 109. The cavity 169 is provided with ports 170, 171 and 172. The port 170 is connected with the passage 147; the port 171 is connected with the conduit 165 and restricted passage 164; and the port 172 is connected by means of a conduit 173 with the piston 54. Referring to FIG. 1, it will be noted that the conduit 173 is provided through the shaft 11 and extends through the sleeve 58 to the space between the inner face of the casing member 25 and the piston 54. The lock-up valve 102 may be manually operated by the vehicle operator by any suitable control mechanism (not shown).

The pressure control valve 103 comprises a piston 174 slidably disposed in a cylindrical cavity 175 provided in a valve and pump body 176. The piston 174 is provided with grooves 177 and 178 and a tapered end 179 adapted to seat on a tapered seat 180. A passage 181 connects the groove 178 with the left end of the piston 174.

The cylindrical cavity 175 is in communication with the inlet passage 182 of the pump 42, and the tapered end 179 of the valve piston 174 when on the seat 180 seals the output passage 183 of the pump. The passage 183 and the conduit 128 are connected as shown. The inlet passage 182 of the pump 42 is provided with an oil screen 184 disposed in the sump 146 of the transmission.

The vacuum motor 104 for controlling the pressure control valve 103 comprises a sheet metal casing 185 having a flexible diaphragm 186 fixed therein. A pair of metal washers 187 and 188 are fixed on opposite sides of the diaphragm 186 by means of a stud 189 extending through the washers and the diaphragm. One end of the casing 185 is connected to the fuel intake manifold 190 of the internal combustion gasoline engine of the vehicle by means of a conduit 191 for applying the vacuum present in the manifold 190 on the right side of the diaphragm 186. A spring 192 is provided between the washer 188 and the adjacent end of the casing 185 for resisting the action of the vacuum on the right side of the diaphragm 186. A casing 193 is fixed to the casing 185, and a rod 194 passes through a central opening in the casing 193 and is disposed at one end in a central recess 195 in the piston 174 and on the other end rests on the stud 189. A spring 196 is disposed between the piston 174 and the casing 193 and urges the piston 174 to the left to seat the tapered end 179 of the piston on the seat 180.

A piston 197 is slidably disposed in a cylindrical cavity 198 in the casing 193, and the rod 194 is provided with a shoulder 199 adapted to abut a central portion of the piston 197 through which the rod 194 passes. A pair of compression springs 200 and 201 are provided between the left side of the casing 185 and the piston 197. A passage 202 is provided in the casing 193 in communication with the cylindrical cavity 198 for applying a fluid pressure to the piston 197, and this passage 202 is connected by means of a conduit 203 with the conduit 166.

The pressure reducer valve 105 comprises a piston 204 slidably disposed in connected cylindrical cavities 205 and 206 provided in the valve body 176. The valve piston 204 is provided with lands 207 and 208 slidably fitting within the cavities 205 and 206 respectively. The piston 204 is provided with a port 209 in its land 207, and a passage 210 connects the port 209 with the left end of the piston.

The cavity 205 is connected at its right end with the outlet cavity 183 of the pump 42, and the cavity 205 is provided with an outlet port 211. The cavity 206 is provided with a port 212. The port 211 is connected by means of a conduit 213 to supply fluid pressure to the torque converter 14, the conduit 213 extending between the quill shaft 48 and a forwardly extending sleeve portion 44a of the pump casing 44. The port 212 is a bleed port connected with the sump 146 of the transmission. A compression spring 214 is provided between the valve piston 204 and the left end of the cavity 206, as shown.

The fluid entering the torque converter 14 from the conduit 213 passes through the torque converter and is discharged through a restricted conduit 215 provided between the sleeve shafts 12 and 13, and the fluid passing through the conduit 215 flows to the planetary gear set 16 for lubricating the gear set.

The check valve 106 comprises a valve piston 216 slidably disposed in cylindrical cavities 217 and 218 provided in a valve body 219. The piston 216 is provided with lands 220 and 221 spaced by a groove 222 and has a relatively small diameter stem 223. The stem 223 and land 220 are respectively slidably disposed in the cavities 218 and 217. The land 220 is provided with a slot 224 therein, and the land 221 is provided with a beveled edge 225 which is adapted to contact a seat 226 provided in the cavity 217.

The valve body 219 is provided with a port 227 connected by means of a conduit 228 with the output cavity 183 of the pump 42. The cavity 217 at the seat 226 is connected with the conduit 166 and is thereby connected with the output cavity 229 of the pump 82. A compression spring 230 is provided between the end of the cavity 217 and the land 220.

The input cavity 231 of the pump 83 is connected by means of a conduit 232 with the transmission sump 146, and a screen 233 is provided on the inlet end of the conduit 232 and functions not only for straining the oil drawn into the conduit 232 by the pump 82 but also functions as a viscous restriction in the inlet conduit 232 as will be hereinafter more fully described.

The transmission controls shown in FIG. 2 provide the low speed drive when the selector valve piston 107 is in its "L" or low position; both low and high speed drives are selected automatically when the selector valve piston 107 is in its "D" or drive position; and the reverse drive is provided when the selector valve piston 107 is in its "R" or reverse position. The transmission is maintained in neutral condition when the selector valve piston 107 is in its "N" position. By utilizing the lock-up valve 102, the high speed drive may be maintained completed, and engine braking may alternatively be obtained by moving the selector valve piston 107 either into its "L" position or into its "R" position.

When the selector valve piston 107 is in its "N" position, the lands 111 and 112 block the port 122 with respect to the other ports in the valve 100, and any fluid under pressure in the pressure supply 128 is thus ineffective. It is assumed that the engine of the vehicle is in operation, and the drive shaft 10 is rotating, and the pump 42 provides fluid under pressure transmitting from its cavity 183 to the conduit 128 and connected conduits. The pump 42 functions due to the simultaneous rotation of the gears 43 and 45 which are in mesh, providing a fluid pressure in its outlet cavity 183 and drawing fluid through the screen 184 into its inlet cavity 182 from the sump 146, the operation of this type of pump being in accordance with well-known principles.

The pressure of the fluid discharged by the pump 42 is regulated by means of the pressure control valve 103. The output pressure of the pump 42 in the cavity 183 is impressed upon the left end of the pressure control valve piston 174 tending to move it off its seat 180 to permit the fluid discharged by the pump to be relieved to the inlet cavity 182 of the pump so as to maintain the pressure discharged by the pump at a predetermined maximum. The valve piston 174 is moved to the right as seen in FIG. 2 by the pressure discharged from the pump 42 against the action of the spring 196 acting on the piston 174, against the action of the springs 200 and 201 acting through the piston 197, the shoulder 199, and the rod 194, and against the action of the spring 192 acting through the washer 188 and the stud 189 against the rod 194.

The output pressure of the driven shaft pump 82 is impressed on the piston 197, as will be described; however, since the vehicle is assumed stationary in the neutral condition of the transmission, there is no output pressure from the pump 82, and the springs 200 and 201 act with their full force at this time. The manifold pressure is applied to the diaphragm 186 through the conduit 191 to vary the effect of the spring 192 on the piston 174 for varying the pressure from the pump 42 for purposes hereinafter to be described, but such variations of pressure with changes in the manifold vacuum have no function in the neutral condition of the transmission.

When the selector valve piston 107 is moved from its "N" to its "D" position in which it is illustrated, the low speed drive through the transmission is initially completed, and a subsequent change to high speed drive is obtained automatically due to the operation of the automatic shift valve 101. In the "D" position of the selector valve piston 107, fluid under pressure is supplied from the conduit 128 to the conduit 129 through the port 122, the groove 114 and the port 123. This fluid under pressure is transmitted to the motor 152 for engaging the brake 18 through the port 143, the groove 138 and passage 141 in the valve piston 130 and the conduit 151. At this time, the piston 130 is in a position to the left of its illustrated position and in which the piston tip 159 is in contact with the plate 120. The application of fluid pressure to the piston 153 engages the brake band 79 on the drum 77 and completes the low speed power train. The valve piston 130 under these conditions is shifted to the left of its illustrated position with its reduced diameter end 159 in contact with the plate 120, being held in this position by the spring 150, so that the groove 138 of the piston 130 is in alignment with the port 143 to provide this connection.

The pressure in the conduit 128, which is applied to the servomotor 152 for engaging the brake 18, is maintained at predetermined values by the pressure control valve 103, the pressure varying both with the speed of the vehicle and with the vacuum in the manifold 190. The manifold vacuum is impressed on the diaphragm 186 through the conduit 191 and tends to counteract the effect of the spring 192 which acts through the rod 194 on the piston 174 tending to maintain it on its seat 180. The greater the vacuum in the manifold becomes, with a movement of the vehicle accelerator toward its closed throttle position, the greater will be the counter-action by the diaphragm 186 of the effect of the spring 192 and the greater will be the action of the valve piston 174 to relieve the pressure discharged by the pump 42 and the less will be the predetermined pressure maintained by the valve 103 in the pressure conduit 128 and applied to the brake servo motor 152. Conversely, the less the vacuum is in the manifold 190 with a movement of the accelerator towards its open throttle position, the less will be the effect of the diaphragm 186 and the greater will be the effect of the spring 192 in holding the valve piston 174 on its valve seat 180, so that the pressure output of the pump 42 must rise to a higher value before it is effective to move the piston 174 off its seat 180, and the greater will be the pressure supplied to the brake servo motor 152. Thus, the pressure on the brake servo motor is increased with a throttle opening movement of the accelerator pedal of the vehicle so that the brake 18 is engaged with sufficient intensity so that it cannot slip due to the increased torque delivered by the vehicle engine with the increased throttle opening. However, since the pressure supplied to the brake 18 is variable with throttle opening particularly being decreased with throttle closing, a desirably smooth engaging action of the brake is obtained when the selector valve 100 is first moved into its "D" position.

The effect of the spring 192 just described on the pressure control valve 103 is limited due to the fact that no fixed connection is provided between the stud 189 of the vacuum motor 104 and the rod 194, so that the stud 189 can at times move out of contact with the rod 194 when the vacuum is in the manifold 190 and in the vacuum motor 104 is above a predetermined value. As is well-known, the absolute pressure in the manifold 190, which is the difference of the amount of manifold vacuum subtracted from the value of atmospheric pressure, varies approximately with the torque output of the engine, and the strength of the spring 192 is such that the stud 189 is moved by the diaphragm 186 out of contact with the rod 194 at approximately one quarter of the full output torque of the engine. The stud 189 is out of contact with the rod 194 at closed throttle positions of the vehicle accelerator, under idling conditions of the vehicle engine and when the vehicle is coasting, and the stud 189 comes into contact with the rod 194 on subsequent decreases of manifold vacuum with increased throttle openings when the output of the vehicle engine has reached about one quarter of its full output torque. One of the basic reasons for providing this limited action of the diaphragm 186 on the rod 194 is that approximately the same oil pressure effective on the brake 18 is required so that the brake does not slip when the vehicle is coasting down a hill with the throttle closed as is required to maintain the brake from slipping when the vehicle engine is delivering one quarter of its full output torque. With the stud 189 being out of contact with the rod 194, under these conditions the springs 200, 201 and 196 are effective to maintain a certain minimum fluid pressure in the conduit 128 and applied on the servo motor 152 for the brake 18.

As the vehicle begins to move forwardly, the driven shaft pump 82 begins to discharge fluid under pressure into the conduit 166, the fluid being drawn from the sump 146 through the screen 233 and the conduit 232 into the pump by the pump action. The pump discharged from the pump 82 flows through the conduit 166, the conduit 165, the restricted passage 164 and the orifice 155 to be discharged into the sump. The resilient metal strip 157 carrying the valve element 156 by means of the valve element partially closes the orifice 155, and the pump output discharging through the orifice 155 impinges on the valve element 156 and resilient strip 157 causing the strip to deflect and the valve element 156 to move farther out of the orifice 155. The orifice 155 is sharp edged on both ends to cause fluid turbulence.

The discharge from the pump 82 increases with the speed of the vehicle, since the pump is driven from the driven shaft 11 of the transmission; and the screen 233, the restricted passage 164, the turbulent orifice 155, the valve element 156 and the resilient strip 157 cooperate together so that the fluid in the cavity 136 discharged by the pump 82 increases in pressure coordinately with increases in speed of the driven shaft 11 and of the vehicle approximately the same regardless of the variations in the temperature of the fluid and regardless of resulting changes in viscosity of the oil used in the transmission the pressure in the cavity 136 for a certain speed of the driven shaft 11 being substantially the same regardless of temperature and viscosity changes.

The turbulent orifice 155 in itself tends to cause the pressure in the cavity 136 to remain approximately the same regardless of temperature and viscosity changes, due to the turbulent flow through the orifice. The valve element 156 and the resilient metal strip 157 carrying the valve element on which the flow through the orifice 155 impinges causes the pressure in the cavity 136 to remain even more steady with changes in temperature and viscosity, and the screen 233 and restricted passage 164 also assist in this action. The leaf spring 157 deflects away from the plate 120 to a greater extent the lower the temperature and the greater the viscosity of the oil become, to cause the valve element 156 to provide a greater effective opening through the orifice 155, so as to tend to cause a decrease in the pressure in the cavity 136 to tend to maintain the oil pressure steady; however, this greater deflection is only obtained as the result of a slight increase in pressure in the cavity 136, as is apparent. A balancing drop in the pressure in the cavity 136 is obtained due to the action of the screen 233 and the passage 164 which both function as viscous restrictions, that is, restrictions presenting a relatively large area over which the oil flows, tending to restrict its flow. The screen 233, being on the inlet side of the pump 82 tends to starve the pump 82, and the restricted passage 164 being in the inlet to the cavity 136 tends to starve the supply of oil to the cavity 136 and the turbulent orifice 155. The viscous effect of the screen 233 and the passage 164 is balanced against the tendency of the spring 157 to move outwardly on an increase in pressure in the cavity 136, so as to obtain, as the final result, a pressure in the cavity 136 that changes very little with changes in oil temperature and viscosity. The pressure in the conduit 166, although this conduit is separated from the cavity 136 by the viscous restriction 164, nevertheless also changes only a little more with changes in viscosity and temperature. The pressure drop difference in the oil flowing through the restricted passage 164 quite closely balances the pressure drop difference which occurs by the flow of oil through the turbulent orifice 155 when the resilient strip is biased outwardly from the plate 120 under cold oil conditions as distinguished from the ordinary position of the resilient strip 157 closer to the plate 120 when the oil is under normal operating temperatures and viscosities as the result of continuous operation of the vehicle for a substantial length of time.

Although I do not intend to limit my invention to particular sizes of orifices 155 and 164, I have found, as an example, that a substantially constant pressure of fluid in the cavity 136 is obtained when the diameter of the passage 164 is 20 or 30% smaller than the diameter of the turbulent orifice 155. For example, in one particular embodiment, the diameter of the passage 164 is .140 inch, and the diameter of the orifice 155 is .168 inch, giving very good results.

The fluid pressure in the conduit 166 which increases in accordance with vehicle speed, as has just been noted, is impressed through the conduit 203 and passage 202 on the end of the piston 197, tending to move the piston 197 to the right against the action of the springs 200 and 201. The greater the pressure in the conduits 166 and 203 becomes with increases in vehicle speed, the greater the fluid pressure on the piston 197 becomes, counteracting to a greater and greater extent the effects of the springs 200 and 201, so that the springs 200 and 201 have less effect in holding the piston 174 on its seat 180, thereby relieving the fluid pressure discharged from the pump 42 to a greater and greater extent and reducing the pressure discharged by the pump 42 with increases in vehicle speed.

As has been described in connection with the transmission itself, the low speed power train includes the torque converter 14, and, in general, with such converters, the torque multiplication decreases with increases in vehicle speed. Thus, the pressure effective for holding the brake 18 engaged for completing the low speed forward drive power train, as the vehicle speed increases, need not be maintained at the high initial value and may be decreased. The vehicle speed variable fluid pressure in the conduits 166 and 203 impressed on the piston 197 has this effect, namely, to decrease the fluid pressure from the pump 42 and applied to the servo motor 152 as the vehicle speed increases and thereby as the torque multiplication in the torque converter 14 decreases.

The pressure in the conduit 128, which is varied in accordance with the speed of the vehicle due to the speed responsive pressure in the conduit 203 impressed on the piston 197 and also with the torque output of the vehicle engine by reason of the manifold pressure impressed on the diaphragm 186 is applied to the servo motor 152 for the forward drive brake 18. This pressure in the conduit 128 increases with engine torque output and decreases with increases in vehicle speed, and the torque output of the torque converter 14 to the shaft 12 varies in substantially the same manner, that is, the output torque of the torque converter 14 increases with the output torque of the engine and it decreases with increasing speeds of the vehicle and of the shaft 11 due to the inherent operating characteristics of the hydraulic torque converter of the type shown. The fluid pressure applied to the brake servo motor 152 and thereby the pressure of engagement of the brake 18 thus vary in the same manner as the output torque of the hydraulic torque converter 14 varies. As will be hereinafter described, the brake 18 is disengaged, and the clutch 15 is engaged for changing the drive through the transmission from an underdrive to a direct drive, and the clutch 15 is disengaged and the brake 18 is engaged under certain conditions for changing from the direct drive back again to the under drive, and both of these ratio changes are relatively smooth due to this variation in pressure in the supply conduit 128 with output torque of the vehicle engine and speed of the driven shaft. As has been described, the stud 189 of the diaphragm 186 moves away from the rod 194 when the engine torque output is less than approximately one quarter of its full output torque for maintaining a predetermined lower limit of the pressure in the conduit 128, and this maintains the clutches or brakes, as the case may be, engaged when the vehicle is coasting or the engine idling. The piston 197, having the driven shaft pump pressure in the conduits 166 and 203 effective thereon, has a corresponding action in moving away from the abutment 199 when a certain speed of the vehicle is reached. This speed corresponds approximately with the speed at which the one-way brake 36 disengages and the torque converter 14 functions as a simple fluid coupling with no torque conversion. There is thereafter no effect from increasing speeds of the vehicle and of the shaft 11 on the pressure in the conduit 128 effective on the clutches or brakes of the transmission for decreasing such pressures, and no such pressure reducing effect is required since there is no further reduction in torque conversion of the hydraulic torque converter 14.

The pressure reducer valve 105 functions to maintain a fluid pressure in the torque converter 14 that varies directly with the line pressure supplied by the pump 42 and present in the conduit 128 and connected conduits. The fluid under pressure discharged by the pump 42 is applied to the right end of the valve piston 204 and tends to move the valve piston 204 to the left against the action of the spring 214 to open the port 211 to the conduit 213 which is the supply conduit for the torque converter 14. The fluid under pressure in the conduit 213 is supplied through the port 209 and passage 210 in the valve piston 204 to the left end of the valve piston 204 so that this pressure augments the action of the spring 214 in tending to move the piston 204 back to the right to again close the port 211. The net effect of the spring 214 and the pressure in conduit 213 supplied to the left end of the valve piston 204 is to cause the valve 204 to function as a regulator valve maintaining the pressure in the conduit 213 at a certain fraction of the pressure discharged by the pump 42 and regulated by the pressure control valve 103. Thus, the pressure in the converter 14, varies as the line pressure in the conduit 128 and increases with throttle opening and decreases with increases in vehicle speed. In order to prevent cavitation of fluid in the torque converter, it is necessary to increase the pressure in the converter with increases in torque conversion by the converter. The pressure in the converter is thus caused to vary directly with line pressure in the conduit 128 to increase with increased opening of the throttle of the vehicle engine and increase with decreasing speeds of the vehicle. This variation in the converter pressure also has a desirable effect in connection with the clutch 15, which is in the same housing as the impeller 19 and the runner 20 of the torque converter, for reasons hereinafter to be described.

The vehicle speed variable pressure produced by the sharp edged orifice 155 is impressed on the left end of the valve piston 130. The pressure in the conduit 129 which increases with engine throttle opening is impressed on an opposite face 133a of the piston 130 from the conduit 129. When the pressure from the driven shaft pump 82 increases sufficiently so that it overcomes the effect of the pressure on the face 133a and the force due to the spring 150, the valve piston 130 moves to the right into its illustrated position so as to connect the passage 147 with the passage 129 through the port 143, the groove 139 and the port 144. The passage 147 is connected through the valve 102 in its illustrated position and the passage 173 with the piston 54 of the direct drive clutch 15, and the application of fluid pressure to the direct drive clutch piston 54 moves the piston to the right as seen in FIG. 1 to engage the clutch disc 52 between the piston 54 and the pressure plate 53. The direct drive power train is thus completed. The valve piston 130 in its illustrated position connects the conduit 151 for the servo motor 152 for the brake 18 with the sump 146 through the passage 141 and the port 142 so as to cause disengagement of the brake 18. The low speed power train is thus broken on this movement of the piston 130. Actually, the pressure in the cavity 136 for the automatic shift valve 101 increases slightly with decreasing oil temperatures, regardless of the action of the turbulent orifice 155 and resilient strip 157; however, the pressure in the conduits 128 and 129 controlled by the valve 103 vary in the same manner with temperature, so that the automatic shift valve piston 130 shifts to its high speed position substantially for the same vehicle speeds, regardless of changes in oil temperatures, for the same throttle openings.

The pressure of application of the clutch 15 by the clutch piston 54 connected with the line pressure conduit 128 increases with increased throttle opening. The piston 54 being in the housing formed by the impeller housing members 22 and 25 acts against the pressure in the torque converter, and since the pressure in the torque converter varies directly with line pressure but is a substantially constant fraction of line pressure, the net force on the lockup clutch 15 varies directly with engine throttle opening and output torque of the vehicle engine. The clutch 15 is thus capable of carrying the added torque of the vehicle engine as the engine throttle is opened.

As the speed of the vehicle increases after the automatic shift valve piston 130 has been moved into its high speed ratio position, the pressure output of the pump 82 increases sufficiently to move the piston 216 of the check valve 106 upwardly off the seat 226. In this connection, it will be noted that the fluid pressure from the front pump 42 is substantially balanced on the land 220 of the piston 216, since the front pump fluid pressure is impressed on the upper side of the land 220 through the duct 224 as well as being impressed on the lower side of the land 220. This movement of the piston 216 is against the fluid pressure from the pump 42 impressed on the upper side of the land 221 and against the spring 230, and this movement of the piston opens the port 227 and conduit 228 with respect to the conduit 166. Thereafter the driven shaft pump 82 supplies most of the fluid under pressure for maintaining the direct drive clutch 15 engaged.

As has been previously described, the pressure in conduit 166 effective on the lower face of the check valve piston 216 increases with the speed of the driven shaft 11, and the pressure from the front pump 42 which is impressed on the upper face of the land 221 decreases with driven shaft speed and increases with the output torque of the vehicle engine. The greater the torque output, therefore, the greater is the tendency for the valve piston 216 to remain in its closed position in which it is illustrated in FIG. 2. The check valve piston 216 thus may open at a relatively low speed, such as twenty-five miles per hour, with a relatively light throttle; but, at a relatively heavy throttle, the check valve piston 216 will not open until some higher vehicle speed, such as 50 miles per hour. As has been previously described, the automatic shift valve piston 130 similarly does not move from its low speed ratio position to its direct drive position until relatively high speeds are reached when there is a relatively high torque output of the vehicle engine. This action of the check valve 106 thus assures that the pressure in the conduit 166 and cavity 136 remains responsive to the speed of the driven shaft 11 until after a change takes place from low speed ratio to direct drive. Once the check valve piston 216 has opened, the pressure output of the driven shaft pump 82 increases no further with increases in vehicle speed, and the pump 82 pumps only against that pressure which is maintained in the system by means of the pressure control valve 103.

When the valve piston 107 of the selector valve 100 is moved into its "L" position, the reduced end portion 119 of the piston 107 moves against the leaf spring 160 and moves it out of contact with the resilient strip 157, so that the strip 157 may flex outwardly relatively easily under the fluid pressure applied to it and the valve element 156 from the driven shaft pump 82. The output pressure of the driven shaft pump 82 is thus reduced drastically so that it cannot under these conditions be effective to move the automatic shift valve piston 130 into its illustrated position against the action of the spring 150 and the throttle variable pressure applied to the face 133a of the piston 130. The automatic shift valve piston 130 thus remains in its low speed position in which the groove 138 is aligned with the port 143 for maintaining the low speed brake 18 engaged, and the transmission remains in its low speed ratio.

Assuming that the transmission is in direct drive and the selector valve 100 is moved into its "L" position, the transmission will change from its direct drive ratio to its low speed ratio under ordinary circumstances, except when the vehicle speed is so high that the engine in low speed ratio would be rotating at too high a speed. Under these conditions, even though the leaf spring 160 is flexed outwardly out of contact with the resilient strip 157, the pressure in the chamber 136 remains sufficiently high for holding the valve piston 130 in its illustrated direct drive position against the action of the spring 150 and the existing fluid pressure at the right end of the valve piston 130.

The reverse drive power train through the transmission is completed by moving the selector valve piston 107 into its "R" position. The piston 107 in this position connects the port 122 with the port 121 by means of the groove 114, so that the regulated pump pressure from the front pump 42 is applied through the conduit 124 to the servo motor 125 to engage the reverse drive brake 17. The brake 17 is engaged, due to the variation of line pressure in the conduit 128 as previously described, with a pressure that increases with the opening of the vehicle engine throttle. For reverse drive, however, the driven shaft pump 83 is not operative to supply fluid pressure to the conduit 166 since the driven shaft 11 is rotating in the reverse direction, and the line pressure in the conduit 128 and applied to the servo motor 125 for the reverse brake 17 is not decreased with increases in vehicle speed, however, this is not important for reverse drive, since no automatic speed ratio changing takes place in reverse drive and a speed variable pressure is not needed for providing smooth ratio changes.

The lock up valve 102 provides a relatively mild engine braking condition of the engine when the lock up valve 102 is actuated with the selector valve piston 107 being simultaneously in its "L" position, and the lock up valve 102 when actuated provides a relatively drastic engine braking condition when the selector valve is simultaneously in its "R" position. The selector valve 100 when when in its "L" position causes engagement of the low speed brake 18, as has been described. With the selector valve piston 107 remaining in this position, if the lock up valve is moved into its actuated position to connect the ports 171 and 172 and block the port 170, the lock up clutch 15 is simultaneously engaged. Fluid pressure is applied to the piston 54 for the clutch 15 from the passage 165, through the port 171, the slot 168 of the valve piston 167, the port 172 and the conduit 173. The brake 18 and the clutch 17 are simultaneously engaged giving the relatively mild engine braking condition previously described.

The selector valve piston 107 when in its "R" position causes engagement of the reverse brake 17, as has been described. If the lock up valve 102 is simultaneously put into its lock up position connecting the ports 171 and 172, the clutch 15 will again be engaged by the fluid pressure derived from the driven shaft pump 82, and in this case the reverse brake 17 and the direct drive clutch 15 will be simultaneously engaged giving the relatively drastic engine braking condition previously described.

The lock up valve 102 may be utilized for engaging the clutch 15 for starting the engine by towing or pushing the vehicle. The valve 102 is put into its lock up position connecting the ports 171 and 172, and the driven shaft pump 82 in response to movement of the driven shaft 11 produces a fluid pressure in the conduit 166 which is applied to the piston 54 for the clutch 15 as has been previously described in connection with lock up conditions of the transmission. When a sufficiently high pressure from the pump 82 is attained, the check valve 106 opens against the pressure of the spring 230 so as to connect the conduits 166 and 228. The pressure in the conduit 228 and connected conduits is then regulated by the pressure control valve 103 so as to regulate the pressure of engagement of the clutch 15 by means of the pressure control valve 103.

Figure 3:
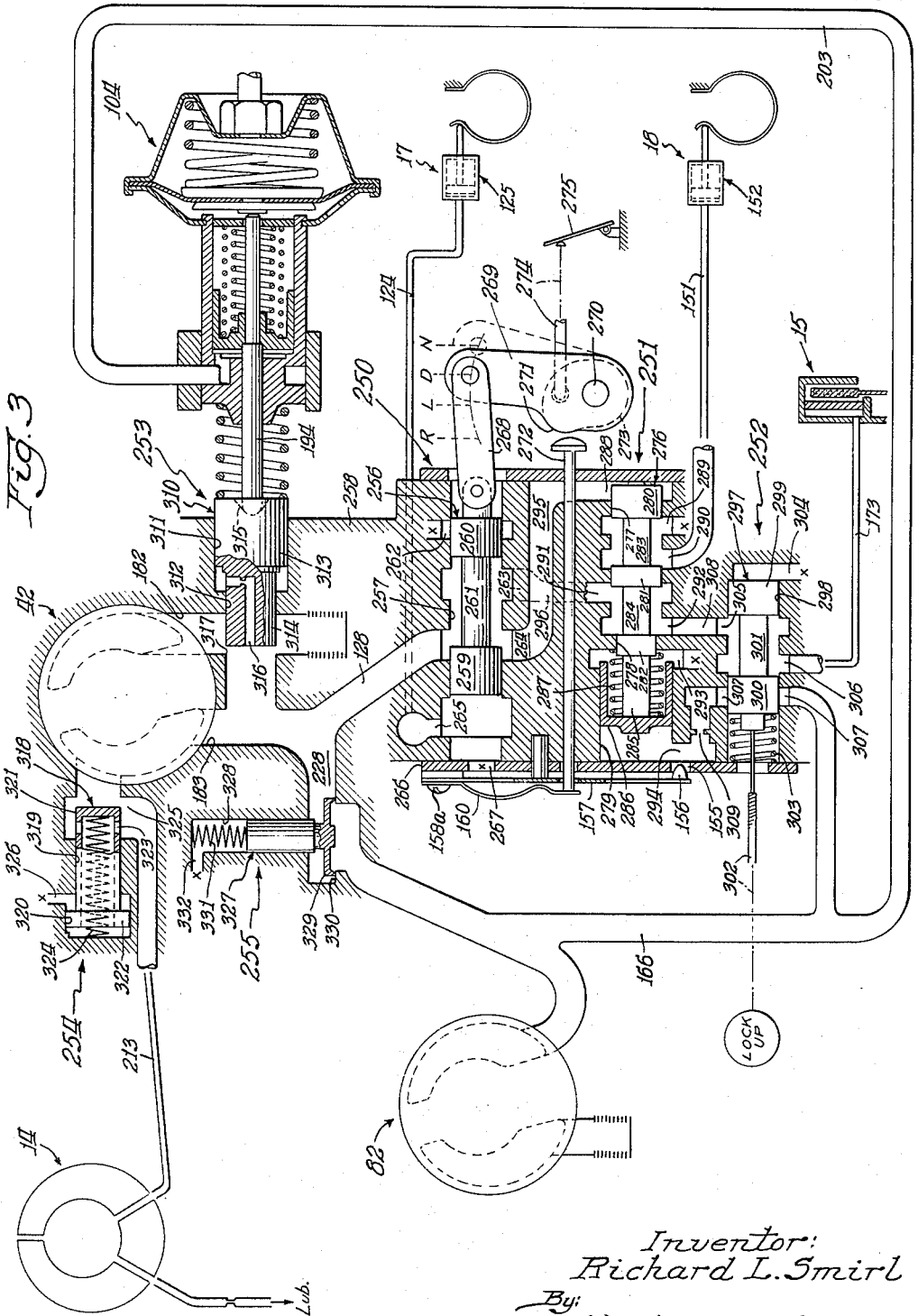
FIG. 3 is a diagram showing a modified form of the transmission controls.

The embodiment of the transmission controls shown in FIG. 3 has control valves of substantially the same number and type as in the FIG. 2 embodiment; however, the details of construction and operation of some of the valves differ. The FIG. 3 embodiment of the controls includes a manual selector valve 250, an automatic shift valve 251, a lock up valve 252, a pressure control valve 253, a pressure reducer valve 254, and a check valve 255. The pressure control valve actuator 104 in the second embodiment is the same as in the first embodiment, and the second embodiment includes the same pumps 42 and 82 and the same converter 14 as the first embodiment.

The manual selector valve 250 comprises a piston 256 slidably disposed in a cylindrical cavity 257 provided in a valve body 258. The piston 256 comprises lands 259 and 260 separated by a groove 261. The cylindrical cavity 257 is provided with ports 262, 263, 264 and 265. The port 262 is a bleed port adapted to freely discharge into the sump 146; one of the ports 264 is connected with the pressure supply conduit 128; and the port 265 is connected with the conduit 124 for applying fluid pressure to the servo motor 125 for the brake 17. A plate 266 is fixed by the screw 158a to the valve body 258, and the plate 266 is provided with a port 267 for venting the left end of the cavity 257 to the sump 146.

The valve piston 256 is connected by means of a link 268 with a lever 269 swingably mounted on a shaft 270. The lever 269 is provided with a projecting portion 271 adapted to make contact with the enlarged end of a rod 272 slidably disposed in the valve body 258. The rod 272 is adapted to make contact with the end of the auxiliary spring 160, similarly to the thin end portion 119 of the selector valve piston 107 in the first embodiment, the rod 272 extending through openings in both the plate 266 and the resilient strip 157 as shown in FIG. 3.

A cam plate 273 is swingably mounted on the shaft 270 adjacent the lever 269, and the plate 273 also has a projecting portion 271 adapted to contact the enlarged end of the rod 272, similarly to the lever 269. The plate 273 has a link 274 attached thereto, and the link is adapted to be contacted by the accelerator or throttle pedal 275 of the vehicle when the accelerator 275 is moved to a full open throttle position. It will be understood that the usual connections (not shown) between the accelerator 275 and the carburetor of the internal combustion engine of the vehicle are provided, and, of course, other more elaborate linkage may be provided between the accelerator 275 and the cam plate 273 by means of which the plate 273 is rotated on the shaft 270 to contact the rod 272 when the accelerator is moved to an open throttle position.

The automatic shift valve 251 comprises a piston 276 slidably disposed in connected cavities 277, 278 and 279 provided in the valve body 258. The cavities 278, 277 and 279 are respectively of increased diameter with respect to each other. The piston 276 comprises lands 280, 281 and 282 separated by grooves 283 and 284, and also a reduced diameter end portion 285. The lands 280 and 281 are slidably disposed in the intermediate size cavity 277 and the land 282 is slidably disposed in the small-sized cavity 278. A hollow piston 286 is slidably disposed in the cavity 279 and is adapted to be contacted by the end 285 of the piston 276. A compression spring 287 is disposed between the inner end of the cavity in the hollow piston 286 and an end of the cavity 279 in the valve body 258.

The cavity 277 is provided with ports 288, 289, 290, 291, 292; and the cavity 279 is provided with ports 293 and 294. The port 288 is in communication with the port 264 by means of a passage 295; the port 289 is a bleed port adapted to freely discharge fluid to the sump 146; the port 290 is connected with the conduit 151 and thereby with the servo motor 152 for the brake 18; the port 291 is connected with the port 263 by means of a passage 296; and the port 293 is a bleed port adapted to freely discharge fluid to the sump 146. The left end of the cavity 279 is in communication with the orifice 155 closed by the valve element 156 carried by the strip 157 as shown.

The lock up valve 252 comprises a valve piston 297 slidably disposed in a cylindrical cavity 298 provided in the valve body 258. The piston 297 comprises lands 299 and 300 separated by a groove 301. The valve may be actuated by means of a Bowden wire 302 controlled from the instrument board of the vehicle in which the transmission is installed and extending through an appropriate opening in the plate 266 to the valve piston 297. A compression spring 303 is provided between the plate 266 and the left end of the piston 297.

The cavity 298 is provided with ports 304, 305, 306 and 307. The port 304 is a bleed port adapted to discharge to the sump 146 of the transmission; the port 305 is connected by a passage 308 with the port 292; the port 306 is connected by means of the conduit 173 with the clutch 15; one of the ports 307 is connected with the fluid supply conduit 166 from the driven shaft pump 82; and the other port 307 is connected through a restriction 309 with the port 294.

The pressure control valve 253 comprises a piston 310 slidably disposed in connected cylindrical cavities 311 and 312 open to the inlet cavity 182 of the pump 42. The piston 310 comprises lands 313 and 314 slidably disposed respectively in the cavities 311 and 312. The valve 310 is provided with a recess 315 in its end for receiving the rod 194 and is provided with a passage 316 extending therethrough in communication with the cavity 311. The valve piston 310 is adapted to abut against a seat 317 provided in the valve body 258 for closing the outlet cavity 183 of the pump 42 with respect to the inlet cavity 182 of the pump.

The pressure reducer valve 254 comprises a piston 318 slidably disposed in connected cylindrical cavities 319 and 320 in the valve body 258. The piston 318 is hollow and comprises lands 321 and 322 respectively slidable within the cavities 319 and 320. Ports 323 are provided through the valve piston 318, as shown. A compression spring 324 is provided in the piston 318 extending between the bottom of the internal cavity in the piston 318 and the end of the cavity 320. The cavity 319 is provided with a port 325 connected with the conduit 213 and the cavity 319 is open to the cavity 183 of the pump 42, as shown. The cavity 320 is provided with a port 326 adapted to freely discharge fluid into the sump 146.

The check valve 255 is disposed in the conduit 228 and comprises a valve piston 327 slidably disposed in a cylindrical cavity 328 provided in the valve body 258. The piston 327 has an enlarged end 329 adapted to seal on a seat 330 in the conduit 228. A compression spring 331 is provided in the cavity 328 and is disposed between the end of the piston 327 and the adjacent end of the cavity 328. The cavity 328 has a port 332 open to the sump 146.

The control valving shown in FIG. 3 provides substantially the same results as that shown in FIG. 2 with the exception that a kick-down may be obtained from high speed ratio to low speed ratio when the accelerator is moved to an open throttle kick-down position due to the connection provided between the control valving and the accelerator pedal, and the FIG. 3 control mechanism has a different shift sequence as far as the manual selector valve is concerned, the shift sequence in the FIG. 3 embodiment being reverse, low, drive and neutral while the shift sequence in the FIG. 2 embodiment is low, drive, neutral and reverse.

In the FIG. 3 embodiment, when the selector valve piston 256 is in its neutral position, the land 259 blocks the line pressure conduit 128 and the transmission is in neutral. When the selector valve piston 256 is moved into its "D" position, the low speed drive power train through the transmission is completed and the transmission is conditioned for an automatic shift into high speed drive. With the piston 256 being in this position, the ports 264 and 263 are connected by means of the groove 261 so as to supply fluid under pressure to the port 291 of the automatic shift valve 251. The automatic shift valve 251 in its low position is moved to the limit of its movement to the left so that the piston 286 contacts the plate 266, and in this case the groove 283 of the valve piston 276 connects the ports 291 and 290 so as to apply line pressure through the passage 151 to the low speed brake 18. The low speed power train through the transmission is thus completed. The port 292 of the valve 251 is bled to the bleed port 293 in this position of the valve piston 276 so that the clutch 15 is disengaged.

The pressure control valve 253 functions similarly to the pressure control valve 103, the pressure on the left end of the piston 310 tending to move the valve piston to the right against the action of the springs 196, 201, 200 and 192. Fluid pressure, however, in this case is applied through the passage 316 in the valve piston 310 against the left end of the land 313 for preventing air from being drawn into the pump 42 through the valve 253. The regulating effect of the valve piston 310, however, is substantially the same as for the valve piston 174 in the first embodiment of the controls.

The pressure reducer valve 254 in the FIG. 3 embodiment of the controls, although differing somewhat in mechanical detail, performs the same functions as the pressure reducer valve 105 in the first embodiment. The valve piston 318 moves to the left under the influence of the pressure output of the engine driven pump 42, and the fluid under pressure metered into the torque converter supply passage 213 is supplied through the port 323 and the valve piston 318 to the left end of the valve where it is impressed on the land 322 of the piston 318 augmenting the action of the spring 324 tending to close the valve 254.

With the selector valve 250 remaining in its "D" position, the pressure output of the vehicle driven pump 82 is supplied through the conduit 166, the connected ports 307, the restriction 309 and the port 294 to the orifice 155 which regulates the output pressure of the vehicle driven pump 82 similarly as in the first embodiment. This fluid pressure from the driven shaft pump 82 is impressed on the piston 286 of the automatic shift valve 251 and tends to move the pistons 276 and 286 to the right as seen in the figure. The line pressure in the conduit 128 supplied by the pump 42 and regulated by the pressure control valve 253 is supplied through the ports 264 and the passage 295 to the right end of the valve piston 276, so that the line pressure in the conduit 128, which increases with depression of the accelerator pedal, tends to hold the pistons 276 and 286 against movement to the right. When the driven shaft pump pressure in the conduit 166 increases sufficiently, however, with increases in vehicle speed, it forces the pistons 276 and 286 to the right against the action of the spring 287 acting between the piston 286 and the end of the cavity 279 and against the action of the line pressure on the right end of the valve piston 276 and moves the pistons 276 and 286 into the position in which they are illustrated in FIG. 3. In this position of the piston 276, it connects the ports 291 and 292 by means of the groove 284 in the piston 276 to supply fluid pressure to the clutch piston 54, the connection being by means of the passage 308, the port 305, the groove 301, the port 306 and the passage 173. The direct drive friction clutch 15 is thus applied to provide direct drive. In this shifted position of the valve piston 276, the groove 283 connects the ports 290 and 289 so as to drain the servo motor 152 for the low speed brake 18 to the sump 146 and cause disengagement of the low speed brake 18. The pressure in the torque converter 14 impressed on the piston 54 for the direct clutch 15 tending to prevent engagement of the clutch varies as in the previous embodiment of the invention so that the net engaging effect of the clutch 15 is the same as in the previous embodiment.

The transmission may be downshifted from high speed ratio to low speed ratio under the control of the accelerator 275 by moving the accelerator to an open throttle kick-down position. The cam plate 273 is connected with the accelerator 275 by means of the link 274 which is contacted by the accelerator when moved to this position, and the cam plate 273 is swung about its pivot shaft 270 so as to engage the rod 272 with its projection 271 and move the auxiliary spring 160 off the resilient strip 157. This causes a drastic reduction in the output pressure of the driven shaft pump 82 similarly as is caused by the valve piston 107 when the latter is moved to its "L" position in the FIG. 1 embodiment, and the spring 287 and line pressure on the right end of the piston 276 are effective to move the pistons 276 and 286 back to their low speed positions.

The transmission may be downshifted from its high speed drive to its low speed drive by moving the selector lever 269 so as to move the valve piston 256 from its "D" to its "L" position. The valve piston 256 in its "L" position connects the same ports as in its "D" position; however, movement of the selector lever 269 into the "L" position moves its projection 271 to contact the rod 272 and thereby moves the auxiliary spring 160 away from the resilient strip 157, similarly as for a kick-down by means of the accelerator 275, and the transmission is shifted into its low speed drive.

The selector valve piston 256 is moved into its "R" position to condition the transmission for reverse drive. In this position of the piston 256, the groove 261 connects the ports 264 and 265 so as to provide line pressure to the reverse brake servo motor 125 through the conduit 124. The reverse brake 17 is thus engaged by line pressure. The selector valve piston 256 in its reverse position blocks the port 263, and fluid pressure is thus not supplied through the passages and ports leading to the piston 54 for the direct clutch 15 or the passages and ports leading to the servo motor 152 for the low speed brake 18.

The lock up valve 252 functions like the valve 102 in the first embodiment of the controls for connecting the clutch piston 54 of the direct drive clutch 15 with the driven shaft pump 82 when the lock up valve 252 is open. The lock up valve 252 is opened by moving the valve piston 297 to the left to block the port 305 by the land 299 and to connect the ports 307 and 306 by means of the groove 301. The port 307 is connected with the driven shaft pump 82 and pressure from the driven shaft pump is thus applied to the piston 54 for the clutch 15. The clutch 15 may thus be applied when the low speed drive or the reverse speed drive is completed through the transmission by having the selector valve piston 256 either in its "L" or its "R" position, respectively, and thus either the previously mentioned relatively mild engine braking effect may be obtained by this simultaneous engagement of the clutch 15 and the completion of the low speed power train or the relatively drastic engine braking effect may be secured by the simultaneous engagement of the clutch 15 and the completion of the reverse drive power train.

The embodiment of the transmission controls illustrated in FIGS. 4, 5 and 6 is quite similar to the embodiment of the controls shown in FIG. 2 with the principal exceptions being the modification of the pressure reducer valve 105, additional adjustments for the leaf spring 157 and its valve element 156 and the provision of electrical controlling mechanism for the leaf spring 157. In the FIG. 4 embodiment, the same pumps 82 and 42, substantially the same manual selector valve 107, the same automatic shift valve 101, the same pressure control valve 174 and the same torque ratio compensator 104 are utilized, although the torque ratio compensator 104 is not illustrated.

The modification made to the pressure reducer valve 105 comprises the substitution of an elongated port 340 for the relatively small exhaust port 212. The purpose of the elongated port 340 is to provide an exhaust for the cavity 206 in which the spring 214 is disposed, assuming that the valve piston 204 moves to the right as seen in FIG. 4 to a position to substantially close the cavity 205 from communication with the outlet cavity 46 of the pump 42. The arrangement is such that when the valve piston 204 moves sufficiently to the right to completely close the cavity 205, continued movement of the piston 204 causes the piston land 208 to uncover the port 340 to a greater extent. Such a movement of the valve piston 204 to the right takes place when pressure is admitted through the conduit 173 to the piston 54 for applying the clutch 15. This application of pressure to the piston 54 moves the piston to engage the clutch 15 which is in the direction reducing the volume of the chamber 51 proper of the torque converter 14 and at the same time therefore causes an upsurge of pressure in the chamber 51 of the torque converter 14, fluid being forced through the openings 53a in the pressure plate 53 into the chamber 51 proper by the piston 54. This upsurge of pressure is transmitted to the left end of the pressure reducer valve piston 204 through the conduit 213, port 209 and passage 210, and this increased fluid pressure acts on the left end of the pressure reducer valve piston 204 and moves it to the right to temporarily close the cavity 205 with respect to the outlet cavity 46 of the pump 42. This same movement of the piston 204 vents the cavity 206 to the elongated discharge port 340 and thus relieves the surge of fluid pressure.

The provision of the elongated port 340 for dumping the pressure from the torque converter 14 when the piston 54 moves to engage the clutch 15 allows a quicker, more instantaneous, engagement of the clutch 15. Motion of the piston 54 would otherwise be somewhat retarded since the surge of fluid pressure would have to be drained through the restriction 215 and the lubrication system connected with the restriction. Such instantaneous engagement of the clutch 15 assures that the direct drive power train is completed with substantially no engine runaway, that is, excess speed of the engine caused by a substantial breaking of power transmission from the drive shaft 10 to the driven shaft 11 when both power trains are for an instant broken.

The plate 120 in the FIG. 4 embodiment of the controls has been provided with a sharp edged orifice 341 which has substantially the same diameter as the orifice 155 in the FIG. 2 embodiment of the controls; however, the orifice 341 is shorter to provide increased turbulence of the flow of fluid through the orifice. The orifice 341 is shorter due to a recess 342 provided in the plate 120 around the orifice 341. The increased turbulence of fluid flow through the orifice 341 provides an improved regulating characteristic of the orifice with even less change in fluid pressure with changes in viscosity and temperature than provided by the turbulent orifice 155 in the FIG. 2 embodiment of the controls.

In the FIG. 4 embodiment, a leaf spring 343 has been substituted for the spring 160. The spring 343 carries a pin 344 contacting the resilient strip 157, and an adjustable screw 345 has been provided to take the place of the pin 162. A second adjustable screw 346 is provided beneath the resilient strip 157 adjacent the valve element 156, and a third adjustable screw 347 has been provided through the plate 120 adjacent the fixed end of the resilient strip 157. A leaf spring 348 of semi-elliptical form has been provided between the adjusting screw 347 and the resilient strip 157, as shown.

The adjusting screw 346 functions to hold the valve element 156 out of the orifice 341 a predtermined distance and is effective when the fluid pressure discharged from the rear pump 82 is not sufficiently high to move the valve element 156 farther out of the orifice 341. The vehicle speeds at which an upshift or change from reduced speed drive to direct drive or a downshift during which a change from direct drive to reduced drive takes place, may be adjusted by the screw 346 particularly for light throttle conditions. The downshift vehicle speed for the same throttle opening is, of course, less than the vehicle speed for upshifting with the same throttle opening, since once the valve piston 130 has shifted into its high speed drive position in which it is illustrated, the pressure from the conduit 128 is effective only on the land face 133a instead of on both the face 133a and the right end of the piston 130 as in the low speed drive position of the valve piston 130.

The screw 345 has a function similar to the pin 162 in the FIG. 2 embodiment of the controls, which is to form a pivot point for the resilient strip 157, when the exterior spring 343 is effective on the strip 157. The screw 345 is adjusted primarily for changing the vehicle speeds at which upshifts and downshifts are obtained under heavy throttle conditions. The more the screw 345 is moved to the left in the plate 120, the greater will be the tendency for the valve element 156 to move outwardly in the orifice 341, and the lower will be the vehicle speeds at which upshifts and downshifts occur under heavy throttle conditions.

As will be hereinafter described, the strip 343 is moved away from the resilient strip 157 when a kickdown which is a downshift caused by movement of the accelerator to an open throttle positon, is desired. The screw 347 is adjustable for changing the maximum vehicle speed at which a kickdown is obtainable and above which it is impossible to downshift the transmission by kicking down. The more the screw 347 is moved to the right through the plate 120 to relieve the force on the strip 157 through the semi-elliptic spring 348, the more will be the tendency of the valve element 156 to remain in a blocking position with respect to the turbulent orifice 341 and the lower will be the vehicle speed above which a kickdown is obtainable.

In the FIG. 4 embodiment, the tip 119a of the manually movable selector valve piston 107 has been made shorter than the tip 119 in the FIG. 2 embodiment, and the leaf strip 157 has been allowed to remain imperforate with respect to the tip. When the selector valve piston 107 in this embodiment of the controls is moved into its low speed position, the tip 119a directly contacts the resilient strip 157 and moves the valve element 156 out of the turbulent orifice 341 so as to relieve the pressure in the cavity 136 effective on the shift valve piston 130 to allow the piston 130 to move into its low speed drive position. This arrangement of the valve piston tip 119a contacting the strip 157 directly assures that a downshift by means of the valve piston 107 may be obtained at vehicle speeds higher than those at which a kickdown by means of the vehicle accelerator may be obtained.

The kickdown mechanism in the FIG. 4 embodiment of the controls which causes a change from direct drive to reduced speed drive when the accelerator of the vehicle engine is moved to an open throttle kickdown position functions similarly to the mechanical kickdown mechanism illustrated in FIG. 3 in acting on the external auxiliary spring 343 (corresponding to the spring 160 in FIG. 3) in raising the spring so as to make it ineffective on the resilient strip 157 when the change from direct drive to the reduced speed drive is to be made. The electrical controls in FIG. 4 also incorporate an additional feature of rendering the kickdown mechanism subject also to the operation of the vehicle braking mechanism for the road wheels.

The electrical control mechanism illustrated in FIG. 4 comprises a magnetizable core 349 having a solenoid winding 350 disposed thereon, one end of which is grounded at 351. The magnetizable core 349 is disposed adjacent a keeper 352 of magnetizable material fixed to the auxiliary spring 343 so that magnetization of the core 349 will attract the keeper 352 and pull the spring 343 out of contact and effective relationship with the resilient strip 157. The other end of the winding 350 is connected by a lead 353 with a kickdown switch 354, and this switch is connected by another lead 355 with the vehicle battery 356 which is grounded at 357.

The kickdown switch 354 comprises a pair of electrical contacts 358 adapted to be bridged by a movable conductor blade 359 mounted on an axially movable rod 360. The rod 360 is held in its illustrated position with the blade 359 out of contact with the contacts 358 by means of a spring 361, and the rod 360 is adapted to be acted on by the vehicle accelerator 362 so as to move the blade 359 to bridge the contacts 358 when the accelerator is moved to an open throttle kickdown position. The accelerator 362 is of the usual construction yieldably held in an engine idling position by means of a spring 363 and connected by any suitable linkage 364 with the butterfly valve 365 of the carburetor of the vehicle engine. The connection with the butterfly valve 365 is such that the valve is moved slightly beyond a full open throttle position as shown in dotted lines when the accelerator 362 is moved into its kickdown position in which the blade 359 bridges the contacts 358.

A switch 366, which is operated from the fluid pressure applied to the brakes for the vehicle road wheels, is connected in parallel with the switch 354. The switch 366 comprises a pair of contacts 367 adapted to be bridged by a movable conductor blade 368. The blade 368 is moved by a diaphragm 369 that is under the influence of the pressure applied to the vehicle brakes through a conduit 370 from the usual master cylinder 371 actuated by the brake pedal 372 of the vehicle. The switch 366 is similar to the ordinary stoplight switch used in automotive vehicles in everyday use, and no further detailed description of this switch is deemed necessary. It is, however, so constructed that more than the usual braking effort is required in order to move the blade 368 to bridge the contacts 367 than is required for a similar switch used in connection with the vehicle stoplight, so that a very light braking effort on the pedal 372, although operating the stoplight of the vehicle, does not close the switch 366.

The fluid pressure actuated switch 366 and kickdown switch 354, when either of the switches is closed, have the effect of causing a change from direct drive to reduced speed drive assuming that the vehicle is travelling below a predetermined high speed. When the switch 354, for example, is closed by a movement of the accelerator 362 to its kickdown position, which is slightly beyond its fully opened throttle position, a circuit is completed from the battery 356 through the switch 354 and the solenoid winding 350 so as to magnetize the solenoid core 349. Magnetization of the core 349 attracts the keeper 352 and moves the pin 344 out of contact with the resilient strip 157 carrying the valve element 156. The fluid pressure from the driven shaft pump 82 and effective on the right end of the automatic shift valve 130 is reduced, since the resilient strip 157 is now effectively anchored at its extreme upper end rather than at the screw 345, and the valve piston 130 moves into its low speed ratio position, assuming that the speed of the car is not sufficiently high even with the increased venting of the turbulent orifice 341 to maintain the valve piston 130 in its high speed position.

A similar change from direct drive to reduced speed drive is obtained when the vehicle brakes are applied by means of the pedal 372 with a substantial effort. The fluid pressure applied to the vehicle brakes closes the switch 366 by moving the strip 368 to bridge the contacts 367, and the same circuit is completed except that it is through the switch 366 in parallel with the kickdown switch 354. The switch 366 assures that the downshift out of direct drive will be made sufficiently early so that there will be no stalling of the vehicle engine on very sudden stops, even though the downshift points for the automatic shift piston 130 are not raised. The vehicle speed at which the piston 130 shifts into its low speed position from its high speed position under light throttle conditions when the vehicle is decelerating may be at eleven miles per hour, for example, but the action of the switch 366 may cause such a downshifting movement of the piston 130 at twenty miles per hour, for example, under braking conditions.

The valving including the valve pistons and valve casing 109 of the FIG. 4 embodiment are preferably installed adjacent the rear pump 82 as shown in FIGS. 5 and 6. With such an installation of the control valving, the conduit between the pump 82 and the orifice 341 is kept at a minimum length and results in eliminating all cored and drilled passages in the transmission casing 47 itself.

An interconnection is shown in the FIG. 4 embodiment between the lockup valve 102 and the selector valve piston 107. The valve 102 is provided with a control crank 373 which is connected by means of a link 374 with one end of a walking beam 375. The beam 375 is pivoted at 376, and its upper end is adapted to be contacted by one end of the selector valve piston 107. A spring 377 is provided for yieldably holding the walking beam 375 and the valve crank 373 in their positions illustrated in FIG. 4. The walking beam 375 is adapted to be actuated by means of a Bowden wire 378 attached to a button 379 preferably located on the instrument panel of the vehicle.

The beam 375 is contacted by the selector valve piston 107 when the piston 107 is moved toward its "R" position, and, during such movement, the piston 107 rotates the beam 375 about its pivot 376 against the action of the spring 377 so as to rotate the crank 373 for the valve 102 in the clockwise direction through the link 375 and move the valve 102 into its lockup position. The walking beam 375 has a slip connection with the end of the Bowden wire 378 and such movement of the walking beam 375 thus does not cause a corresponding movement of the button 379. Assuming, however, that the walking beam 375 is in its illustrated position, the crank 373 may be rotated in the clockwise direction to its lockup position by pulling the button 379 to the left as seen in FIG. 4, this being for the purpose of supplying pressure to the clutch 15 for starting the engine by towing or pushing the vehicle.

Assuming that the vehicle is moving forwardly and the vehicle operator desires to obtain a drastic braking effect, as when descending a hill, he may move the selector valve 107 into its "R" or reverse position which gives the drastic braking effect hereinbefore described. This movement of the valve piston 107 through the beam 375 and link 374 moves the lockup valve 102 into its lockup position, so that the direct drive clutch is simultaneously engaged, along with completion of the reverse drive power train, and the vehicle engine is thereby prevented from stalling.

As has been previously described, the lockup valve 102 is connected with the driven shaft pump 82, and due to the fact that the pump 82 does not have any output pressure when the driven shaft of the transmission is rotating in the reverse direction, even though the lockup valve 102 is in its lockup position due to the action of the walking beam 375, the direct drive clutch 15 is not engaged when the transmission is effective to drive the vehicle rearwardly.

My improved transmission advantageously is so arranged that two different power trains may be completed simultaneously, with one including the torque converter 14 and the other being a direct drive exclusive of the torque converter, for providing improved engine braking for the vehicle. This engine braking effect is particularly pronounced when the reverse drive power train is completed by the brake 17 simultaneously with engagement of the direct drive clutch 15. In this connection, I provide hydraulic controls including two valves one (valve 100 or 250) of which is utilizable to complete either the reverse drive or the low speed forward drive between the hydraulic torque converter and the driven shaft and the other (valve 102 or 252) of which is utilizable for engaging the direct drive clutch 15. The second valve (valve 102 or 252) is preferably connected with the driven shaft pump 82 of the transmission so that this valve has still another advantageous function, namely, of controlling engagement of the direct drive clutch 15 with driven shaft pump pressure to provide a power train through the transmission when the vehicle engine is inoperative, for the purpose of starting the vehicle engine by pushing or towing the vehicle.

The transmission utilized advantageously is of the type in which a low speed ratio is provided through a hydraulic torque converter 14 connected in tandem with a torque multiplying planetary gear set 16, and a reverse drive is provided by braking the runner 20 or driven element of the torque converter 14 and utilizing the stator 21 of the torque converter for driving in the reverse direction through the planetary gear set 16 wherein the reverse drive torque is multiplied. A direct drive friction clutch 15 is provided for direct drive through the transmission. Both low speed drive and direct drive provide an engine braking effect in forward drive since these are two-way drives, and an augmented engine braking effect is provided with both the low speed drive and the direct drives simultaneously completed. A vehicle braking effect for forward drive is also provided by completing the reverse drive power train by engaging the brake 17, and I have found that at certain vehicle speeds the reverse drive power train with the vehicle moving forwardly causes the vehicle engine to stall. I overcome such stalling by engaging the direct drive clutch 15 at the same time as the reverse drive power train, so that the engine continues to rotate along with the driven shaft 11 of the transmission.

In connection with the two valves previously mentioned (valves 100 and 102 in the FIGS. 2 and 4 embodiments and valves 250 and 252 in the FIG. 3 embodiment), in my FIG. 4 embodiment I provide an interconnection between the valves, so that whenever the reverse-low speed valve 100 is moved into its reverse drive position, it causes the second valve 102 to connect the driven shaft pump 82 of the tranmission with the direct drive clutch 15. For ordinary reverse drive, this movement of the second valve 102 has no effect since the driven shaft 11 is rotating in the reverse direction and the driven shaft pump 82 is not providing an output; however, for vehicle movement in the forward direction, this assures that the direct drive clutch 15 is always engaged under vehicle braking conditions caused by completion of the reverse drive power train assuring that the engine will not stall.

I provide a connection between the driven shaft pump, the fluid pressure output of which is controlled by means of the turbulent orifice 155 or 341, so that the pressure increases coordinately with the speed of the driven shaft 11, and the piston 197 for the purpose of so acting on the regulating valves 103 and 253 that the pressure discharged by the drive shaft pump 42 is decreased as the speed of the vehicle increases up to a speed corresponding to the clutch point of the converter 14. The pressure from the drive shaft pump 42 initially and finally the pressure from the driven shaft pump 82 are impressed on the clutch 15 and the brakes 17 and 18 of the transmission which complete the various drives through the transmission so that the pressure of engagement and therefore the power required for keeping the clutch and brakes engaged are decreased as the torque conversion in the hydraulic torque converter 14 decreases with increases in vehicle speed. The pumps 42 and 82 need not therefore pump against unduly high pressures at the higher vehicle speeds. The pressure reducer valves 105 and 254 advantageously maintain the pressure in the torque converter 14 at a certain fraction of the line pressure output of the pumps 42 and 82 so that the pressure in the converter 14 increases and decreases in the same manner as the line pressure, that is, increases with increased throttle opening and decreases with increased vehicle speed. This change in converter pressure is in accordance with pressure requirements for the converter in order that fluid cavitation may not obtain.

The line pressure output of the drive shaft pump 42 is impressed on the land 133a of the automatic shift valve 101 for the purpose of retarding the shift of the automatic shift valve piston 130 from its low speed position to its high speed position depending on the extent of throttle opening. Since the driven shaft pump pressure is impressed on the piston 197 of the torque ratio compensator 104, this line pressure impressed on the land 133a of the automatic shift valve piston 130 also varies with the driven shaft speed as well as throttle opening and decreases with the driven shaft speed. The left end of the automatic shift valve piston 130 has the fluid pressure impressed on it from the driven shaft pump 82 that increases with driven shaft speed, so that a crossing of the forces tending to move the piston 130 in opposite directions occurs with increases in driven shaft speed, causing a shift of the shift valve piston 130 to occur at accurately predetermined speeds of the driven shaft and vehicle.

I have found that the leaf 157 of homogeneous spring material carrying the valve element 156, particularly operating in a thin sharp edged orifice 341 as shown in FIG. 4 and in connection with the viscous restrictions 164 and 233 which are in the form of a reduced passageway and an oil screen, provides a fluid pressure response from the driven shaft pump 82 that is substantially uniform for the different temperatures of the oil which occur during operation of the transmission under usual operating conditions. The oil as it discharges through the turbulent orifice 155 is impressed not only on the valve element 156 but also on the under side of the leaf spring 157 tending to move the leaf spring and valve element 156 away from the orifice 155 and increase the effective opening of the orifice. This tendency to increase the orifice size is greater with the increased viscosity of the oil due to low temperatures so that a greater pressure relieving effect is obtained from the turbulent orifice at high viscosities to thereby compensate for the viscosity increases. The passage 164 and also the oil screen 233 compensate for increased viscosity of the oil by restricting the flow to the mitering orifices 155 and 341 under these conditions.

The auxiliary spring 160 normally maintaining the leaf spring 157 in contact with the pin 162 is a very advantageous arrangement used in connection with either the selector piston 107 in the first embodiment or the rod 272 and cam projections 271 in the second embodiment. The projection 271 on the cam plate 273, in connection with the rod 272 and auxiliary leaf spring 260, assures that the inertia of the linkage between the auxiliary spring 160 and the accelerator 275 will not have the effect of unduly opening the turbulent orifice 155 by a movement of the valve element 156 out of the orifice on a kickdown. The adjusting screws 345, 346 and 347 advantageously allow adjustments of the vehicle speeds at which shifts between the two forward drives are obtained.

The automatic shift valve piston 103 in the first embodiment of the controls is considered to have an advantageous arrangement, with the driven shaft responsive pressure being applied to one end of the valve which is of relatively large diameter, the throttle responsive pressure applied to an opposite face of the valve also of this diameter, the low speed brake 18 and the high speed clutch 15 being applied and disapplied due to the grooves in the intermediate diameter portion of the valve piston in the valve body 109 and cooperating with adjacent ports in the valve body 109 and with the pressure applied to the servo motor 152 for the low speed brake being also applied to the right small diameter end of the piston 130. This arrangement permits boring the cavities 134, 135 and 136 in the valve body completely from one end instead of having to operate from both ends, as is the case when the small diameter land is in the center rather than at an end of the valve piston.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission for a vehicle having a driving engine with a fuel inlet manifold, the combination of a drive shaft, a driven shaft, means for providing a power train between said shafts and including a fluid pressure operated friction engaging means for completing the power train, a pump for supplying fluid under pressure to said friction engaging means, a regulator valve for regulating the output pressure of the pump as applied to said friction engaging means, a vacuum motor connected with the manifold of the vehicle engine so as to have the vacuum of the manifold applied thereto and mechanically connected with said regulator valve so as to cause the output pressure of the pump as applied to the friction engaging means to vary with changes in the manifold vacuum, a pump driven by said driven shaft and connected with an orifice so as to cause the output pressure of the pump to vary with the speed of the driven shaft, and means for connecting said driven shaft pump with said motor so as to further cause the output pressure of said first-named pump as applied to the friction engaging means to vary with the speed of the driven shaft.

2. In a transmission for a vehicle having a driving engine with a fuel inlet manifold, the combination of a drive shaft, a driven shaft, means for providing a power train between said shafts and including a fluid pressure operated friction engaging means for completing the power train, a pump for supplying fluid under pressure to said friction engaging means, a regulator valve for relieving the pressure of the fluid discharged by said pump for thereby regulating the pump pressure, spring means tending to close said valve, a vacuum motor including a diaphragm connected with the manifold of the vehicle engine for having the manifold vacuum applied thereto and mechanically connected with the regulator valve and acting against said spring means for causing a decrease of the pressure output of the pump on increases in manifold vacuum, a pump driven by said driven shaft and discharging through an orifice whereby the pressure output of the pump increases with the speed of said driven shaft, and means connecting said driven shaft pump hydraulically with said vacuum motor for providing a force on said valve tending to relieve said valve on the increasing speed of said driven shaft and the increasing pressure from said driven shaft pump.

3. In a transmission for a vehicle having a driving engine with a fuel inlet manifold, the combination of a drive shaft, a driven shaft, means for providing a power train between said shafts and including a fluid pressure operated friction engaging means for completing the power train, a pump for supplying fluid under pressure to said friction engaging means, a regulator valve for the fluid pressure output of said pump, a vacuum motor connected with the manifold of the vehicle engine so as to have the variable manifold vacuum applied thereto and mechanically connected by means of a rod with the regulator valve so as to relieve a greater amount of fluid and decrease the pressure of said pump with an increase of vacuum in the engine manifold, a piston acting on said rod, a spring acting on said piston tending to move the regulator valve into a higher fluid pressure regulating position through said piston and rod, and means for applying a pressure that varies with the speed of said driven shaft on said piston to act against said spring for thereby causing the regulator valve to relieve a greater amount of fluid and to decrease the output pressure of said pump as applied to said friction engaging means as the speed of said driven shaft increases.

4. In a transmission, the combination of a drive shaft, a driven shaft, means for providing a low speed drive between said shafts, means for providing a high speed drive between said shafts, means for changing from said low speed drive to said high speed drive and responsive to an increase in fluid pressure for causing the change in drive, means for providing a fluid pressure that increases with the speed of one of said shafts and applied to said shift means for causing the drive change and including a pump driven by said last-named shaft and discharging through an orifice, and a valve element for said orifice for partially closing the orifice and carried by a leaf spring of homogeneous sheet spring material and effective to cause the variation of fluid pressure discharged by said pump to vary substantially the same regardless of temperature changes.

5. In a transmission, the combination of a drive shaft, a driven shaft, means for providing a low speed drive between said shafts, means for providing a high speed drive between said shafts, means for changing from said low speed drive to said high speed drive and being responsive to increases in fluid pressure for causing the change in drive, means for providing a fluid pressure effective on said shift means that increases with the speed of said driven shaft for causing the change in drive and including a pump driven by said driven shaft and discharging through a sharp edged orifice, means providing a viscous restriction providing a large area over which the fluid must flow in the inlet of the pump, a valve element disposed over said orifice for partially closing the orifice, and a leaf spring carrying said valve element and being of homogeneous sheet spring material for cooperating with the valve element and orifice and viscous restriction to provide substantially the same variation of fluid pressure with increases in driven shaft speed regardless of changes in temperature of the fluid.

6. In a transmission, the combination of a drive shaft, a driven shaft, means for providing a low speed power train between said shafts, means for providing a high speed power train between said shafts, means for changing from said low speed power train to said high speed power train and including a shift valve that controls the power train change having a low speed position and a high speed position, and means for providing a fluid pressure on a face of said shift valve that increases with the speed of said driven shaft for causing the valve to shift from its low speed position to its high speed position and including a pump driven by said driven shaft and discharging through an orifice and a valve element for partially closing said orifice, and a leaf spring carrying said valve element and being of homogeneous sheet spring material for causing the variation of fluid pressure with driven shaft speed to remain substantially the same regardless of changes in temperature of the fluid.

7. In a transmission, the combination of a drive shaft, a driven shaft, means for providing a low speed power train between said shafts, means for providing a high speed power train between said shafts, fluid pressure responsive means for changing from said low speed power train to said high speed power train and responsive to increases in fluid pressure for changing the drive from the low speed power train to the high speed power train, means for providing a fluid pressure that increases with the speed of said driven shaft applied to said fluid pressure responsive means and including a pump discharging through an orifice, a valve element partially closing said orifice, a leaf spring carrying said valve element, and an auxiliary spring disposed above and acting on said leaf spring, and means for selectively acting on said auxiliary spring to move it off of said leaf spring for decreasing the fluid pressure applied to said fluid pressure responsive means for causing a change from the high speed power train to the low speed power train.

8. In a transmission, the combination of a drive shaft, a driven shaft, means for providing a low speed drive between said shafts, means for providing a high speed drive between said shafts, means for changing the drive from said low speed drive to said high speed drive and including a shift valve for controlling the drive change and having a low speed position and a high speed position, means for providing a fluid pressure effective on said valve for shifting the valve from its low speed position to its high speed position and including a fluid pump driven by said driven shaft and discharging through an orifice to provide a fluid pressure that increases with the speed of said driven shaft and effective on said shift valve, a valve element partially closing said orifice, a leaf spring anchored at one end and carrying said valve element on its other end, an auxiliary spring acting on said leaf spring and holding it anchored at a point between its said ends, and means for selectively acting on said auxiliary spring for raising it out of contact with said leaf spring for thereby further opening said orifice and decreasing said fluid pressure from said pump to allow said shift valve to move from its high speed position to its low speed position.

9. In a transmission for an automotive vehicle, the combination of a drive shaft, a driven shaft, means for providing a low speed drive between said shafts, means for providing a high speed drive between said shafts, means for changing the drive from said low speed drive to said high speed drive and including a shift valve for controlling the drive change and having a low speed position and a high speed position, means for providing a fluid pressure effective on said valve for shifting the valve from its low speed position to its high speed position and including a fluid pump driven by said driven shaft and discharging through an orifice to provide a fluid pressure that increases with the speed of said driven shaft and effective on said shift valve, a valve element partially closing said orifice, a leaf spring anchored at one end and carrying said valve element on its other end, an auxiliary spring acting on said leaf spring and holding it anchored at a point between its said ends, an accelerator for the vehicle, and means responsive to movement of said accelerator to an open throttle position for moving said auxiliary spring out of contact with said leaf spring so as to allow said valve element to further open said orifice and decrease the fluid pressure from said pump to allow said shift valve to move from its high speed position to its low speed position.

10. In a transmission for an automotive vehicle, the combination of a drive shaft, a driven shaft, means providing a low speed power train between said shafts, means providing a high speed power train between said shafts, each of said means including a fluid pressure operated engaging means for completing the respective power train, a source of fluid pressure, a shift valve having a low speed position and a high speed position and effective to connect the respective engaging means in the respective positions of the valve with said pressure source, governor means for providing a fluid pressure that increases with driven shaft speed and applied to a face of said shift valve tending to shift the valve from its low speed position to its high speed position, and means providing a fluid pressure that increases with increased opening of the throttle of the vehicle engine and impressed on an opposite face of said shaft valve, said low speed engaging means being connected with a cavity at one end of said shift valve so that the fluid pressure applied to said low speed engaging means acts against the end of the valve and tends to hold it from movement to its high speed position.

11. In a transmission for an automotive vehicle, the combination of a drive shaft, a driven shaft, means providing a low speed power train between said shafts, means providing a high speed power train between said shafts, each of said means including a fluid pressure operated friction engaging means for completing the respective power train, a source of fluid pressure, a shift valve having a low speed position for connecting said low speed friction engaging means with said pressure source for completing the low speed power train and having a high speed position for connecting said high speed friction engaging means with said source of pressure for completing said high speed power train, said shift valve having lands of relatively large and intermediate and small diameters with the large and small diameters being on opposite ends of the valve, governor means for providing a fluid pressure that increases with driven shaft speed and applied to the large end of said valve tending to shift the valve from its low speed position to its high speed position, and means responsive to the opening of the vehicle throttle for providing a pressure that increases with throttle opening and applied to the opposite side of said land, said valve having grooves in its intermediate diameter for closing and opening ports to said high speed and low speed friction engaging means, said low speed friction engaging means being connected with a cavity at the small diameter end of the valve so that the fluid pressure applied to the low speed friction engaging means is also applied to the small diameter end of the valve for yieldably holding said valve in its low speed position.

12. In transmission mechanism for an automotive vehicle, the combination of an accelerator for the vehicle, a drive shaft, a driven shaft, means for providing a plurality of different speed ratio drives between said shafts, means for changing from one of said speed ratio drives to another, means for providing a pressure that varies with the speed of said driven shaft and effective on the ratio changing means for changing the speed ratio drive according to driven shaft speed, said last-named means including a pump driven by said driven shaft and a resilient strip subject to the pressure output of said pump and more or less closing an orifice through which the pump output flows, means including an electric solenoid for moving said resilient strip farther away from said orifice so as to increase the effective size of said orifice and cause a change in speed ratio by said ratio changing means, and a switch under the control of said accelerator and connected with said solenoid for causing the energization of the solenoid and said movement of said resilient strip when the accelerator is moved to an open throttle position.

13. In transmission mechanism for an automotive vehicle having a road wheel braking system with a brake pedal, the combination of a drive shaft, a driven shaft, means for providing a high speed ratio drive and a low speed ratio drive between said shafts, means for causing a change from said low speed ratio drive to said high speed ratio drive in response to increases in vehicle speed and including a pump driven by said driven shaft and discharging through an orifice and a resilient strip moving toward and away from the orifice for more or less impeding fluid flow through the orifice so that the pressure from the driven shaft pump increases in accordance with driven shaft speed, and means under the control of said brake pedal for moving said resilient strip away from said orifice to open said orifice to a greater extent to decrease the pressure output of said pump and cause a change from the high speed ratio drive to the low speed ratio drive when the brake pedal is applied.

14. In transmission mechanism for an automotive vehicle having a road wheel braking system with a brake pedal, the combination of a drive shaft, a driven shaft, means for providing a low speed ratio drive and a high speed ratio drive between said shafts, means for changing from said low speed ratio drive to said high speed ratio drive and including a shift valve having a low speed position and a high speed position, means for providing a pressure on said valve tending to shift the valve from its low speed position to its high speed position that increases in accordance with increases in speed of said vehicle and including a pump driven by said driven shaft and discharging through an orifice and a resilient strip more or less impeding the flow of fluid through said orifice, a solenoid for causing said strip to move farther away from said orifice for decreasing the pressure output of said pump so as to cause said shift valve to move back from its high speed position to its low speed position, and electrical means including a switch under the control of said brake pedal for energizing said solenoid and thus causing a decrease of said fluid pressure when said brake pedal is applied.

15. In a transmission, the combination of a drive shaft, a driven shaft, means for providing a reverse drive between said shafts and including a hydrodynamic coupling device driven by said drive shaft, a selector element for causing completion of said reverse drive when moved into its reverse drive position, means for completing a forward drive exclusive of said hydrodynamic device between said shafts and including a fluid pressure engaged friction engaging mechanism for completing the drive, a pump driven by said driven shaft, a valve for connecting said pump and friction engaging mechanism, and an interconnection between said selector element and said valve for moving said valve to connect said pump with said friction mechanism when said selector is moved into its reverse drive position for engaging said friction engaging mechanism and providing a hill braking condition of the transmission mechanism when the vehicle is moving forwardly.

16. In transmission for an automotive vehicle, the combination of a drive shaft, a driven shaft, means providing a reverse drive between said shafts and including a hydrodynamic coupling device driven by said drive shaft, a fluid pressure operated clutch for connecting directly said drive and driven shafts, a pump driven by said driven shaft, a selectively operable valve for connecting said driven shaft pump and said clutch for applying said clutch at will, a selector element movable into a reverse drive position for causing completion of said reverse drive for providing a substantial hill braking effect on said driven shaft, and mechanical interconnecting means between said reverse drive selector element and said valve for causing said valve to move into a position to connect said driven shaft pump and said clutch when said selector element is moved into its reverse drive position and allowing movement of said valve into either position connecting or disconnecting said pump with respect to said clutch when said selector element is out of its said reverse drive position.

17. In a fluid pressure system, the combination of a pump, means forming an orifice through which the output of the pump may discharge, a resilient strip carrying a valve element on one end adapted to extend into said orifice for partially blocking the flow of fluid through the orifice, said strip being anchored at its other end, a stop adjacent said valve element for limiting the movement into the orifice of the valve element, a stop adapted to contact said strip intermediate its ends about which the strip may flex to allow movement of the valve element into and out of the orifice, and a second resilient strip adapted to hold said first-named strip in contact with said intermediate stop, and means for selectively moving said second strip out of contact with said first-named strip.

References Cited in the file of this patent

UNITED STATES PATENTS

| | | |
|---|---|---|
| 1,905,284 | Heitger | Apr. 25, 1933 |
| 1,980,797 | Hale | Nov. 13, 1934 |
| 2,309,051 | Dodge | Jan. 19, 1943 |
| 2,351,483 | Carnagua | June 13, 1944 |
| 2,360,710 | Nutt et al. | Oct. 17, 1944 |
| 2,372,817 | Dodge | Apr. 3, 1945 |
| 2,412,289 | Pugh et al. | Dec. 10, 1946 |
| 2,432,272 | Bariffi | Dec. 9, 1947 |
| 2,433,954 | Lapsley | Jan. 6, 1948 |
| 2,442,840 | Carnagua | June 8, 1948 |
| 2,446,730 | Wemp | Aug. 10, 1948 |
| 2,456,328 | Schneider | Dec. 14, 1948 |
| 2,545,698 | Holley et al. | Mar. 20, 1951 |
| 2,576,336 | Farkas | Nov. 27, 1951 |
| 2,606,456 | Dodge | Aug. 12, 1952 |
| 2,608,880 | Flinn | Sept. 2, 1952 |
| 2,630,895 | McFarland | Mar. 10, 1953 |
| 2,633,035 | Livermore | Mar. 31, 1953 |
| 2,633,760 | Kelley | Apr. 7, 1953 |
| 2,640,373 | Jandasek | June 2, 1953 |
| 2,645,137 | Roche | July 14, 1953 |
| 2,663,393 | Livermore | Dec. 22, 1953 |
| 2,720,124 | Polomski | Oct. 11, 1955 |
| 2,737,824 | Livermore | Mar. 13, 1956 |
| 2,766,639 | Rosenberger | Oct. 16, 1956 |
| 2,787,170 | Forster | Apr. 2, 1957 |